United States Patent [19]
Arimoto

[11] Patent Number: 5,572,303
[45] Date of Patent: Nov. 5, 1996

[54] IMAGE FORMING APPARATUS FOR TRANSFERRING IMAGE ONTO RECORDING SHEET

[75] Inventor: Shinobu Arimoto, Yokohama, Japan

[73] Assignee: Canon Kabushiki Kaisha, Tokyo, Japan

[21] Appl. No.: 376,241

[22] Filed: Jan. 23, 1995

[30] Foreign Application Priority Data

Jan. 24, 1994 [JP] Japan ................................. 6-005908

[51] Int. Cl.⁶ ................................................. G03G 15/14
[52] U.S. Cl. ......................... 399/303; 358/401; 358/404; 358/444; 399/308; 399/298
[58] Field of Search ................................ 355/271–276, 355/326 R, 327, 233, 202, 208, 204; 358/403, 404, 444, 501, 401, 524

[56] References Cited

U.S. PATENT DOCUMENTS

| | | |
|---|---|---|
| 4,748,513 | 5/1988 | Yamada . |
| 4,899,291 | 2/1990 | Tsukada et al. ................ 358/296 X |
| 5,175,632 | 12/1992 | Hayashi et al. ................ 358/401 |
| 5,198,865 | 3/1993 | Haneda et al. ................ 355/326 R |
| 5,229,866 | 7/1993 | Kashiwagi et al. ................ 358/444 |
| 5,253,077 | 10/1993 | Hasegawa et al. ................ 358/404 |
| 5,299,021 | 3/1994 | Gartner ................ 358/401 |
| 5,406,358 | 4/1995 | Kimura et al. ................ 355/271 |
| 5,440,380 | 8/1995 | Takeda ................ 355/271 |
| 5,481,365 | 1/1996 | Arimoto ................ 358/296 |

FOREIGN PATENT DOCUMENTS 0500134 8/1992 European Pat. Off. .
2264022 11/1993 United Kingdom .

Primary Examiner—Matthew S. Smith
Attorney, Agent, or Firm—Fitzpatrick, Cella, Harper & Scinto

[57] ABSTRACT

An image forming apparatus includes a scanner to scan an image of an original, a reading unit such as an image pickup device to read the image of the original which is scanned by the scanner, a memory to store the image of the original read by the reading unit, an image forming unit to form a visible image onto a recording medium on the basis of the image signal from the reading unit and the image signal from the memory, a holding member which can hold a plurality of transfer sheets and is used to transfer the visible image formed on the recording medium onto the transfer sheets held, and a controller for controlling in a manner such that in case of transferring the same image onto each of the plurality of transfer sheets, the plurality of transfer sheets are held to the holding member at irregular intervals and the visible image is formed for the first transfer sheet on the basis of the image signal from the reading unit and the visible image is formed for the second and subsequent transfer sheets on the basis of the image signal from the memory. The image forming unit has a developing unit including a plurality of developers containing developing agents of different colors, and the transfer unit overlaps and transfers the visible images developed by the developing agents of the different colors onto the transfer sheet.

13 Claims, 14 Drawing Sheets

IMAGE FORMING APPARATUS FOR TRANSFERRING IMAGE ONTO RECORDING SHEET

BACKGROUND OF THE INVENTION

1. Field of the Invention

The present invention relates to an image forming apparatus for transferring an image onto a recording sheet.

2. Related Background Art

Hitherto, a color recording apparatus by an electrophotographing process using a transfer drum, a transfer sheet, and an intermediate transfer medium is known as an image recording apparatus which can multi-copy transfer. There is, further, an image recording apparatus which multiple records onto a photosensitive drum or photosensitive belt, or the like. As an example of such an apparatus, there is a color copying apparatus or a color printer as shown in FIG. 15.

In such a color image recording apparatus, developers 65 to 68 containing color developing agents (magenta, cyan, yellow, black) necessary for color recording are arranged around a photosensitive drum 72.

Latent images of the recording colors which were sequentially formed onto the photosensitive drum 72 by a laser beam 60 are developed by the developers corresponding to the respective colors and the developing agents on the photosensitive drum are transferred onto a recording paper wrapped around a transfer drum 64 by a transfer charging device 70. After the latent image of one color on the drum was developed and transferred, the developer is exchanged, the latent image of the next color component is developed by the other color developing agent and is transferred so as to be overlapped onto the preceding transfer image formed on the recording paper on the transfer drum. As mentioned above, the latent images of four colors are sequentially developed by the developing agents of the corresponding colors and are transferred so as to be overlapped onto the recording paper on the transfer drum, thereby forming a color recording image. The developing agents are thermally fixed to the recording paper by a fixing device 73.

In this instance, after that the latent image of the previous color component was developed by the corresponding developer, the developers are exchanged for a period of time until the head of the latent image of the next color component arrives at a developing position of the corresponding developer.

As shown in FIG. 16, an interval between the rear edge of the previous latent image and the front edge of the next latent image corresponds to a length $L_{t1}$ of a portion 27 in which a recording paper 63 is not adhered on the transfer drum. In FIG. 15, when the using order of the developers is set to the order opposite to the rotating direction of the photosensitive drum in a manner such as 68, 67, 66, and 65, a margin of a distance to be used for exchanging the developers is equal to $L_{t1}-y$. In this instance, (y) denotes an arrangement interval among the developers.

When rotational peripheral speeds of the photosensitive drum 72 and transfer drum 64 are set to (z), a time that can be used for exchanging the developers is equal to $(L_{t1}-y)/z$.

As another image recording apparatus, there is an apparatus such that two recording papers 63 are adhered onto the transfer drum at equal intervals as shown in FIG. 17. According to the apparatus, the same latent image is successively formed on the photosensitive drum and those two latent images are developed by the same developer in a lump and are transferred onto different recording papers. Thus, although one color recording image is outputted by four rotations of the transfer drum in the apparatus of FIG. 15, according to the apparatus of FIG. 17, two recording images can be outputted by four rotations of the transfer drum, so that an output speed of the recording image is raised to the value that is twice as high as that of the former apparatus. In such latter apparatus, a time that can be used for exchanging the developers is also equal to $(L_{t2}-y)/z$ by using an interval $L_{t2}$ between the papers.

As further another image recording apparatus which can multi-copy transfer, there is also an apparatus such that a plurality of papers are adhered onto the transfer drum as shown in FIG. 17, only one predetermined developer is used, and the originals are exchanged by using an automatic document feeder. In case of such an apparatus, after images were recorded onto a plurality of papers by using an image of a certain original, the original is exchanged at the paper interval ($L_{t2}$) and a next original image is recorded so as to be overlapped onto the same recording paper. An original exchanging time in such a case is equal to $(L_{t2}-y)/z$ in a manner similar to the above-mentioned case.

In the above conventional apparatus, when images are recorded onto a plurality of recording papers at a further high speed, the peripheral speed (z) of the photosensitive drum and transfer drum has to be raised or the paper interval $L_{t2}$ has to be decreased.

In case of realizing a high speed of the image recording as mentioned above, however, the time that can be used for a change in mechanical recording conditions in the multiple recording such as exchange of the developers or originals or the like decreases. There is an upper limitation of the operating speed in the change of such mechanical recording conditions and there is also an upper limitation when realizing a high recording speed.

SUMMARY OF THE INVENTION

It is an object of the present invention to provide an image forming apparatus in which the foregoing drawbacks are eliminated.

Another object of the invention is to provide an image forming apparatus in which restrictions of the operation of a mechanical construction are small.

Still another object of the invention is to provide an image forming apparatus which can smoothly exchange developers in case of forming a plurality of same color images.

Further another object of the invention is to provide an image forming apparatus which reduces a time necessary for forming a plurality of same images as short as possible.

The above and other objects and features of the present invention will become apparent from the following detailed description and the appended claims with reference to the accompanying drawings.

DETAILED DESCRIPTION OF THE PREFERRED EMBODIMENTS

The present invention will now be described hereinbelow with respective to preferred embodiments.

[First embodiment]

Figure 2:
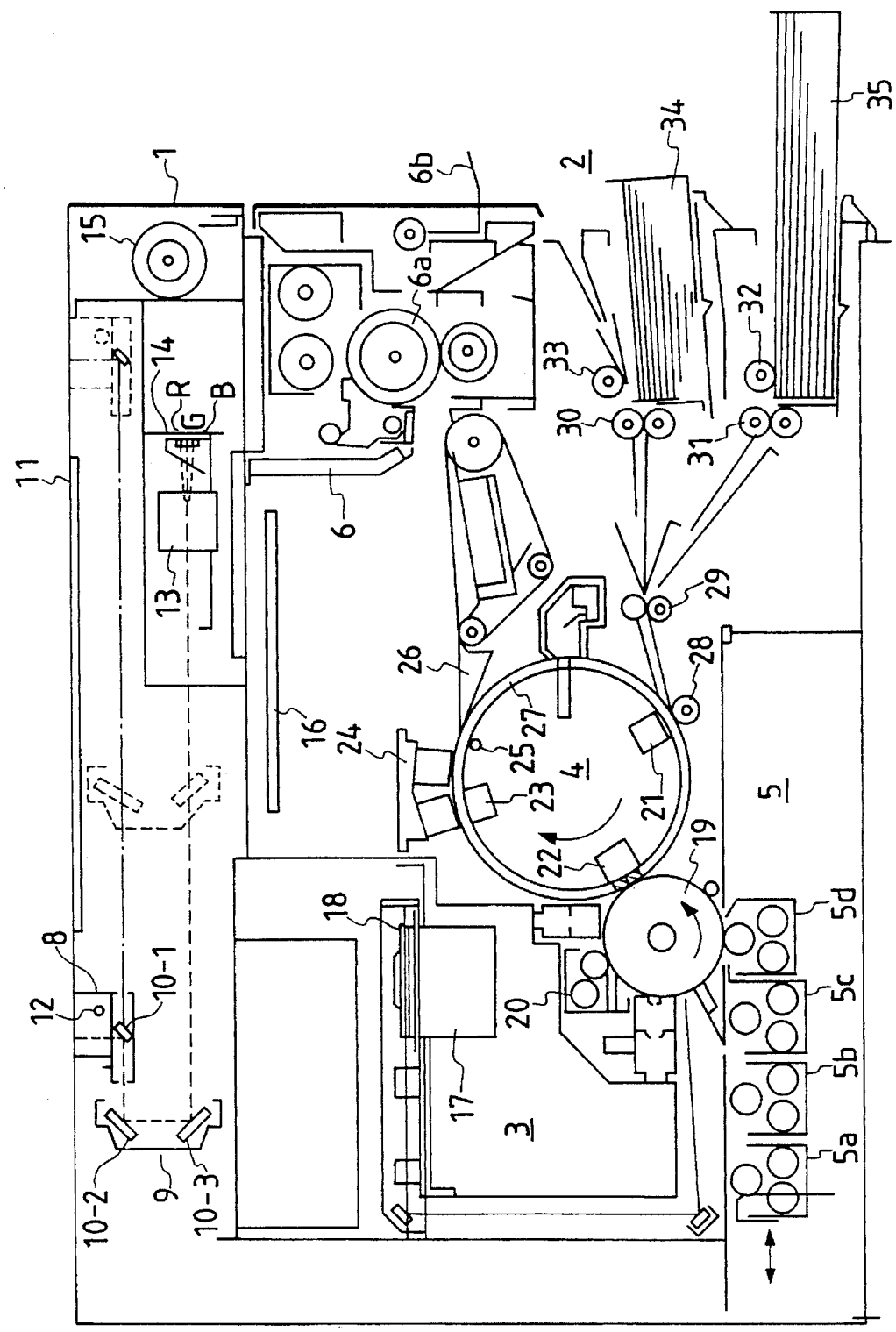
FIG. 2 is a cross sectional view of a color copy apparatus using the invention.

FIG. 2 shows a full color electrophotographic copying apparatus to which the invention can be applied.

In FIG. 2, reference numeral 1 denotes a reader unit corresponding to scanning means, reading means, and input means and which comprises: mirrors 10-1 to 10-3; an original supporting base plate (platen glass) 11; an original illuminating lamp 12; an image forming lens 13; an image pickup device 14; an optical reading driving motor 15; and the like.

In this case, as an image pickup device 14 corresponding to the reading means and input means, a three-line CCD image sensor attached with filters of R (red), G (green), and B (blue) which are adjacently arranged each other is used.

Light information of one same line from an original is projected to line sensors of R, G, and B.

A well-known original scanning unit 8 which is scanned and moved integratedly with the original illuminating lamp 12 and mirror 10-1 is moved by the optical system driving motor 15 at a predetermined speed decided in accordance with a copy magnification, thereby sequentially reading a color original on the original supporting base plate 11 every line. In the embodiment, in order to sequentially execute the recording operations using the developers of the colors such as magenta, cyan, yellow, and black, the original is read out every developing color.

An operation unit is provided around the original supporting base plate (platen glass) 11. Switches for setting various kinds of modes with respect to a copy sequence and a display for displaying are arranged in the operation unit.

Reference numeral 2 denotes a recording paper feed unit comprising paper feed rollers 30 and 31, pickup rollers 32 and 33, and the like. The feed unit 2 feeds the transfer papers enclosed in sheet cassettes 34 and 35 loaded in the apparatus in accordance with a driving command from a controller unit 16.

Reference numeral 3 indicates an image forming unit corresponding to image forming means which comprises a scanner motor 17, a polygon mirror 18, a photosensitive drum 19, and a cleaning unit 20. The color image signal read out by the CCD 14 is processed by the controller unit 16, thereby generating color separation image signals of magenta, cyan, yellow, and black. A laser beam from a laser light source is formed as an image on the photosensitive drum 19 on the basis of each color signal, thereby forming an electrostatic latent image of each color every line.

Reference numeral 4 denotes an image transfer unit corresponding to a supporting member of the transfer papers. The image transfer unit comprises: an adsorption charging device 21; a transfer charging device 22; separation charging devices 23 and 24; a separation pressing roller 25; a separating nail 26; a transfer drum 27; an adsorption roller 28; a resist roller 29; and the like. The transfer paper 63 fed to the position of the resist roller 29 by the paper feed rollers 30 and 31 is conveyed to the transfer drum 27 by the resist roller 29 at a timing at which an image head position of the transfer paper 63 is synchronized with that of the photosensitive drum 19. The transfer paper 63 is electrostatically adsorbed to the transfer drum 27 by the adsorption roller 28 and adsorption charging device 21 serving as opposite electrodes and is wrapped around the drum surface.

The transfer charging device 22 transfers each color developing agent developed on the photosensitive drum 19 to the transfer paper 63.

Reference numeral 5 denotes a developing unit corresponding to image forming means which comprising developers 5a to 5d and the like. The developing unit 5 is reciprocated in the directions shown by arrows by a motor, which will be described hereinlater, so that developing sleeves of the developers are moved to a developing position on the photosensitive drum. The developers 5a to 5d contain the developing agents of black, yellow, cyan, and magenta, respectively.

The electrostatic latent images on the photosensitive drum 19 are visualized by the developers 5a to 5d using the predetermined developing agents. First, the electrostatics latent image of magenta on the photosensitive drum 19 is developed by using the developer 5d of magenta and the developed toner image of magenta is transferred to the transfer paper 63 adsorbed to the transfer drum 27. The electrostatic latent image of cyan on the photosensitive drum 19 is subsequently developed by using the developer 5c of cyan and the developed toner image of cyan is transferred onto the toner image of magenta on the transfer paper 63 adsorbed to the transfer drum 27. In a manner similar to the above, the toner images developed by the developers of yellow and black are sequentially transferred so as to be overlapped onto the transfer paper 63 on the transfer drum.

Reference numeral 6 denotes a fixing unit for fixing the toners of black, yellow, cyan, and magenta to the transfer paper 63 by a fixing roller 6a and the transfer paper 63 is ejected onto a tray 6b.

Figure 1:
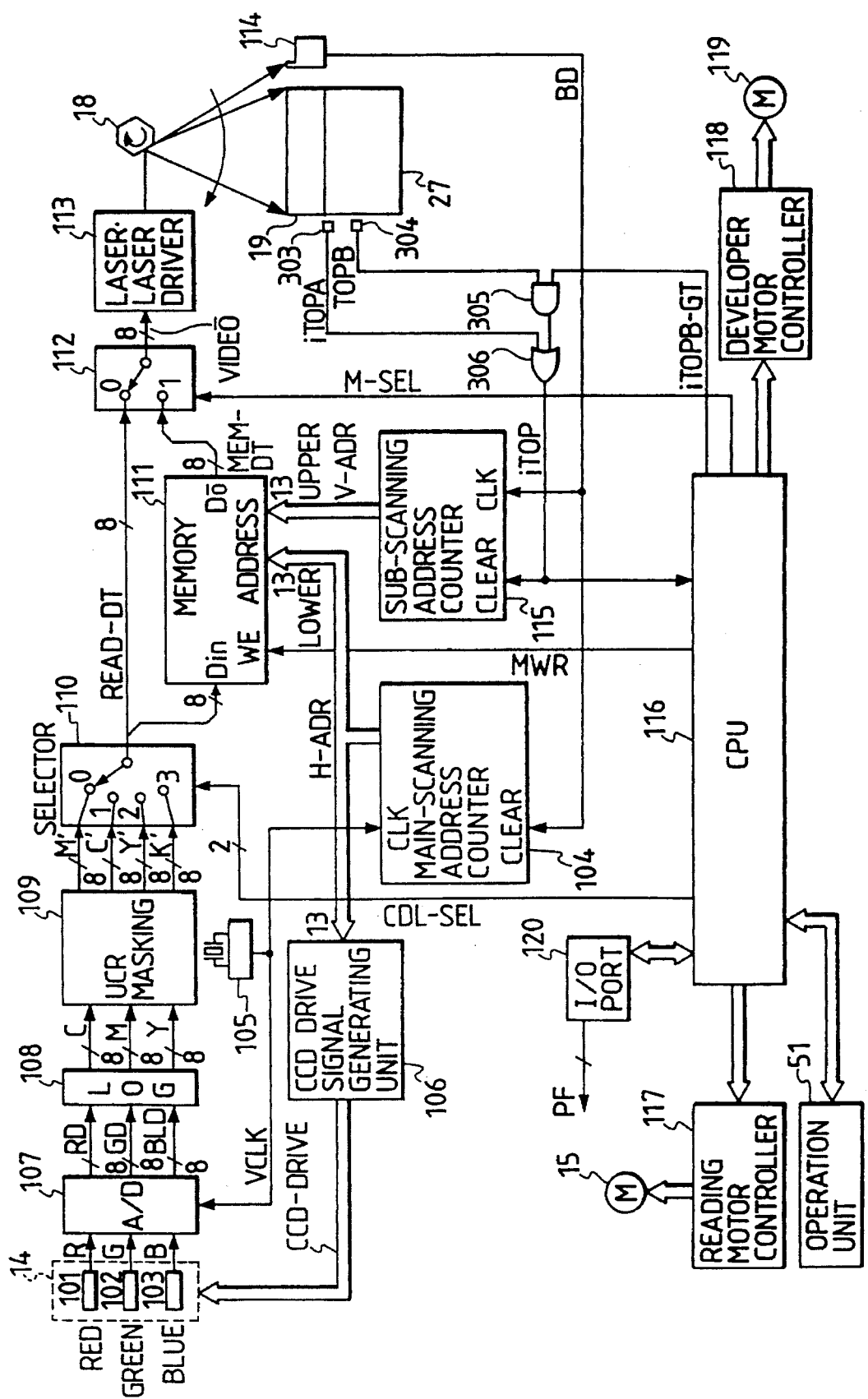
FIG. 1 is a control section of the first embodiment of the invention.

FIG. 1 shows the controller unit 16 and its peripheral control circuits.

The image pickup device (CCD) 14 comprises three-line CCDs 101, 102, and 103 attached with color separating films of red, green, and blue. The CCD 14 color separates the light information of one line from the original and reads out at a resolution of 400 dpi and generates electric signals (image signals) of R (red), G (green), and B (blue). According to the embodiment, since the image having a maximum width of 297 mm (the size of A4) as one line, the image signal corresponding to the image of 4677 pixels of one line for each color of R, G, and B is generated from the CCD 14.

Reference numeral 104 denotes a main-scanning address counter which is cleared every line by a BD signal serving as a sync signal of the recording of each line. The address counter 104 counts the number of VCLK signals from a pixel clock generator 105 and generates a count output H-ADR corresponding to each pixel of the image signal of one line which is read out from the CCD 14. Since the H-ADR is counted up from 0 to 5000, the image signal of one line from the CCD 14 can be sufficiently read out.

Reference numeral 106 indicates a CCD drive signal generating unit for decoding the H-ADR and generating a CCD-DRIVE signal functioning as a shift pulse, a reset pulse, and a transfer clock of the CCD 14. Thus, the color separation image signals of R, G, and B for the same pixel are sequentially generated from the CCD 14 synchronously with the VCLK.

Reference numeral 107 denotes an A/D converter for converting the image signals of red, green, and blue to the digital signals of eight bits; 108 a light amount/density converting unit for converting luminance signals of eight bits of red, green, and blue to density signals of eight bits of cyan (C), magenta (M), and yellow (Y) by a logarithmic conversion; 109 a UCR/masking processing unit for executing a well-known masking arithmetic operation such that the density signal of black is extracted from the density signals of three colors of C, M, and Y by a well-known UCR process (undercolor removing process) and a color blur of the developing agent corresponding to each density signal is eliminated. From density signals of M', C', Y', and K' (black) formed as mentioned above, the image signal of the color corresponding to the developing agent which is used at present is selected by a selector 110. A COL-SEL signal is a signal of two bits which is generated from a CPU 116 for such a color selection. The M' signal in the case where the COL-SEL signal is equal to 0, the C' signal in the case where the COL-SEL signal is equal to 1, the Y' signal in the case where the COL-SEL signal is equal to 2, or the K' signal in the case where the COL-SEL signal is equal to 3 is outputted as a READ-DT signal, respectively.

Reference numeral 111 indicates a page memory to store image data. The page memory has a capacity of one color of the A4 size.

As an address of such a memory 111, the pixel ID count output H-ADR in one line from the main-scanning address counter 104 is supplied as lower bits of the address and a line count output V-ADR from a sub-scanning address counter 115 is supplied to upper bits of the address.

The sub-scanning address counter 115 is initialized by page start signals ITOPA and ITOPB from photosensors 303 and 304 arranged near the transfer drum 27, which will be described hereinlater and generates a line count output within one page.

As mentioned above, the address data of the memory 111 is generated synchronously with the image reading and recording operations on a page unit basis.

The switching of the writing and reading operations to/from the memory 111 is executed by a port output signal MWR from the CPU 116. When the signal MWR is at the H level, the operating mode is set to the writing operation to the memory 111 and in case of the L level, the mode is set to the reading operation from the memory 111.

Reference numeral 112 denotes a selector for selecting either one of the image data READ-DT obtained by processing the image signal read out by the CCD 14 in a real-time manner and read-out data MEM-DT from the memory 111 and outputs a VIDEO signal. Reference numeral 113 denotes a laser & laser driver for controlling (modulating) a light emission amount of a laser in accordance with the VIDEO signal as a density signal of eight bits. The laser beam is scanned in the axial direction of the photosensitive drum 19 by the polygon scanner 18, thereby forming an electrostatic latent image every line onto the photosensitive drum.

Reference numeral 114 denotes a photodetector which is provided near the photosensitive drum 19. The photodetector detects the passage of the laser beam just before scanning the photosensitive drum 19 is scanned, thereby generating the sync signal BD. The main-scanning address counter 1D4 is initialized (cleared) by the BD signal. Reference numeral 115 denotes the sub-scanning address counter for counting the BD signals and generating an upper address V-ADR of the memory 111.

Reference numerals 303 and 304 denote the photosensors for detecting that the transfer drum 27 has reached different predetermined positions, thereby generating the page sync signals ITOPA and ITOPB; 305 an AND gate which selectively allows the ITOPB signal to pass; and 306 an OR gate whose output initializes the sub-scanning address counter 115 and is supplied to the CPU 116.

Reference numeral 116 denotes the CPU corresponding to control means for controlling the image reading and recording operations; 117 a controller for controlling the forward/backward movement and a speed of the reading motor 15; 118 a controller of a developer motor 119 for moving a predetermined developer to the developing position of the photosensitive drum 19 by moving the developers 5a to 5d; and 120 an I/O port for controlling sensors and actuators other than the above-mentioned components elements which are necessary for the control of the copying operation. A PF signal for feeding papers from the cassettes 34 and 35 is also included in the I/O port 120.

Figure 4:
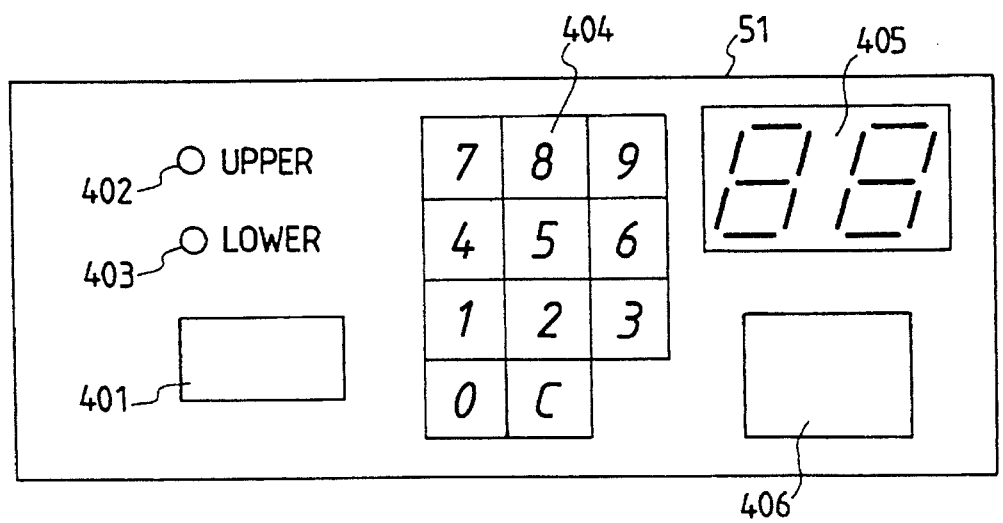
FIG. 4 is an operating section of a color copying apparatus using the invention.

Reference numeral 51 denotes an operation unit and its details are shown in FIG. 4.

Reference numeral 401 indicates a selection switching key of the paper feeding stage; 402 an LED display unit for displaying that the upper cassette 34 was selected; 403 an LED display unit for displaying that the lower cassette 35 was selected; 404 a ten-key for inputting the number of copies and a clear key for clearing the inputted number; 405 an input copy number display unit comprising a 7-segment LED of two digits; and 406 a copy start key.

Figure 3:
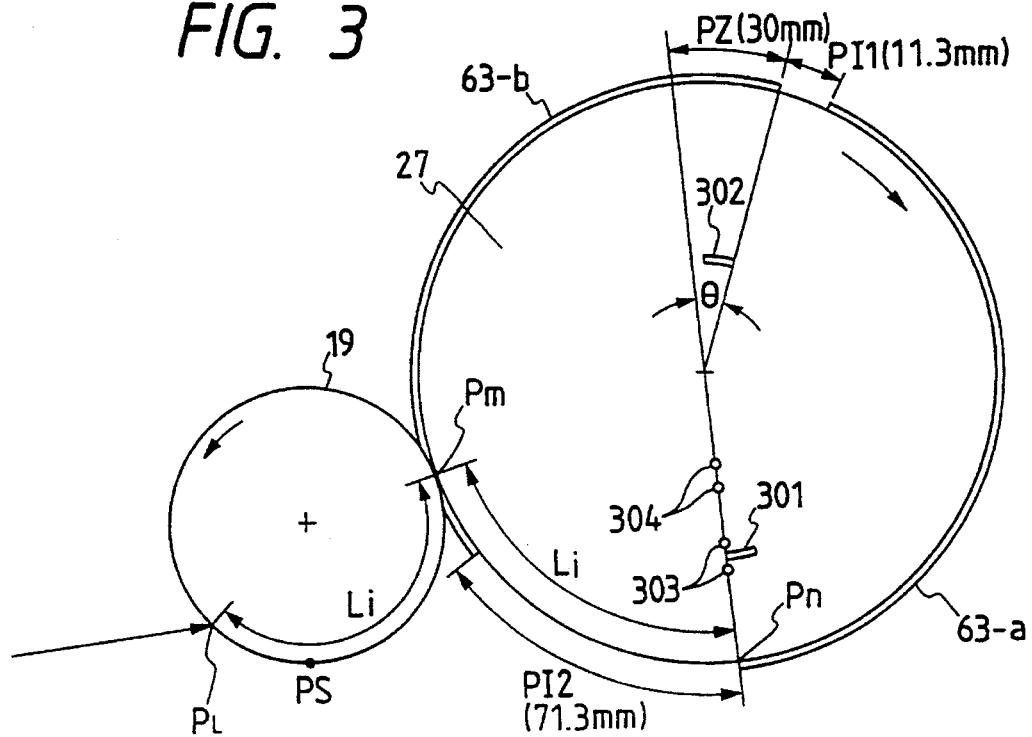
FIG. 3 is a detailed diagram of a transfer drum in the first embodiment.

FIG. 3 shows the details of the photosensitive drum 19 and transfer drum 27.

A diameter of the transfer drum 27 is equal to 160 mm and its circumference is equal to 502.6 mm. One transfer paper of a large size such as A3 size, B4 size, leisure size, or the like is adhered onto the transfer drum 27. This is because a length of the transfer paper in the circumferential direction of the transfer drum is longer than the half circumference of the transfer drum 27. In case of the transfer paper of a small size such as A4 size or letter size in which the length of the transfer paper in the transfer drum circumferential direction is shorter than the half circumference of the transfer drum, a plurality of such small transfer papers can be adhered onto the transfer drum 27. FIG. 3 shows a state in which the two transfer papers 63 of the A4 size are adhered onto the transfer drum 27.

Reference numerals 301 and 302 denote flags attached to the transfer drum. The flags are rotated together with the transfer drum; 303 and 304 the photosensors fixedly attached to the apparatus. The passages of the flags 301 and 302 are detected by the photosensors as shown in the diagram.

The electrostatic latent image formed by the laser beam at a position PL is developed by the toner at a position PS in the circumferential direction of the photosensitive drum 19. At a position Pm at which the transfer drum 27 is come into contact with the photosensitive drum 19, the toner image is transferred to the transfer paper adhered on the surface of the transfer drum 27. A distance between the forming position PL of the latent image and the transfer position Pm is equal to Li. A transfer paper 63-a is adhered to the transfer drum 27 in a manner such that the flag 301 comes to the position of the photosensor 303 when a front edge of the transfer paper 63-a reaches a position that is preceding from the transfer position Pm by the distance Li. Similarly, a recording paper 63-b is adhered to the transfer drum 27 in a manner such that the flag 302 comes to the position of the photosensor 304 when a front edge of the recording paper 63-b reaches a position that is preceding from the transfer position Pm by the distance Li. Therefore, when the photosensor 303 or 304 detects the passage of the flag 301 or 302, by starting to form a latent image onto the photosensitive drum 19, the front edge of the image can be positioned to the front edge of the transfer paper.

The CPU 116 controls the adhering operation of the paper on the basis of the ITOPA and ITOPB signals from the photosensors 303 and 304. The paper 63-a is adhered at the position on an extension line of a line segment connecting the axis of the transfer drum and the flag 301. The paper 63-b is adhered at the position on an extension line of a line segment connecting the axis of the transfer drum and the flag 302.

The flag 302 is arranged at the position that is deviated from the position of the flag 301 by an angle of (π−θ) radian for the center of the transfer drum. Now, assuming that θ=0.375 radian, the head of the paper 63-b is located at a position that is preceding from a point symmetrical position by a distance PZ (=30 mm) for the position of the front edge of the paper 63-a.

The half circumference of the transfer drum is set to 251.3 mm and the short side (210 mm) of the paper of the A4 size is adhered in the circumferential direction, so that a paper interval PI1 is equal to 11.3 mm. A paper interval PI2 is longer than that in the case where the paper is uniformly adhered by a distance of PZ=30 mm and PI2=71.3 mm.

On the other hand, in case of the transfer paper of a large size such as A3 size, B4 size, or leisure size, only one transfer paper can be adhered to the transfer drum 27. In this case, however, the front edge of the transfer paper is adhered at the same position as the transfer paper 63-a in FIG. 3. Namely, in case of the transfer paper of the large size, an output of the photosensor 303 is used as a sync signal of the front edge of the image.

The control of the image formation will now be described with reference to timing charts and flowcharts.

Figure 5:
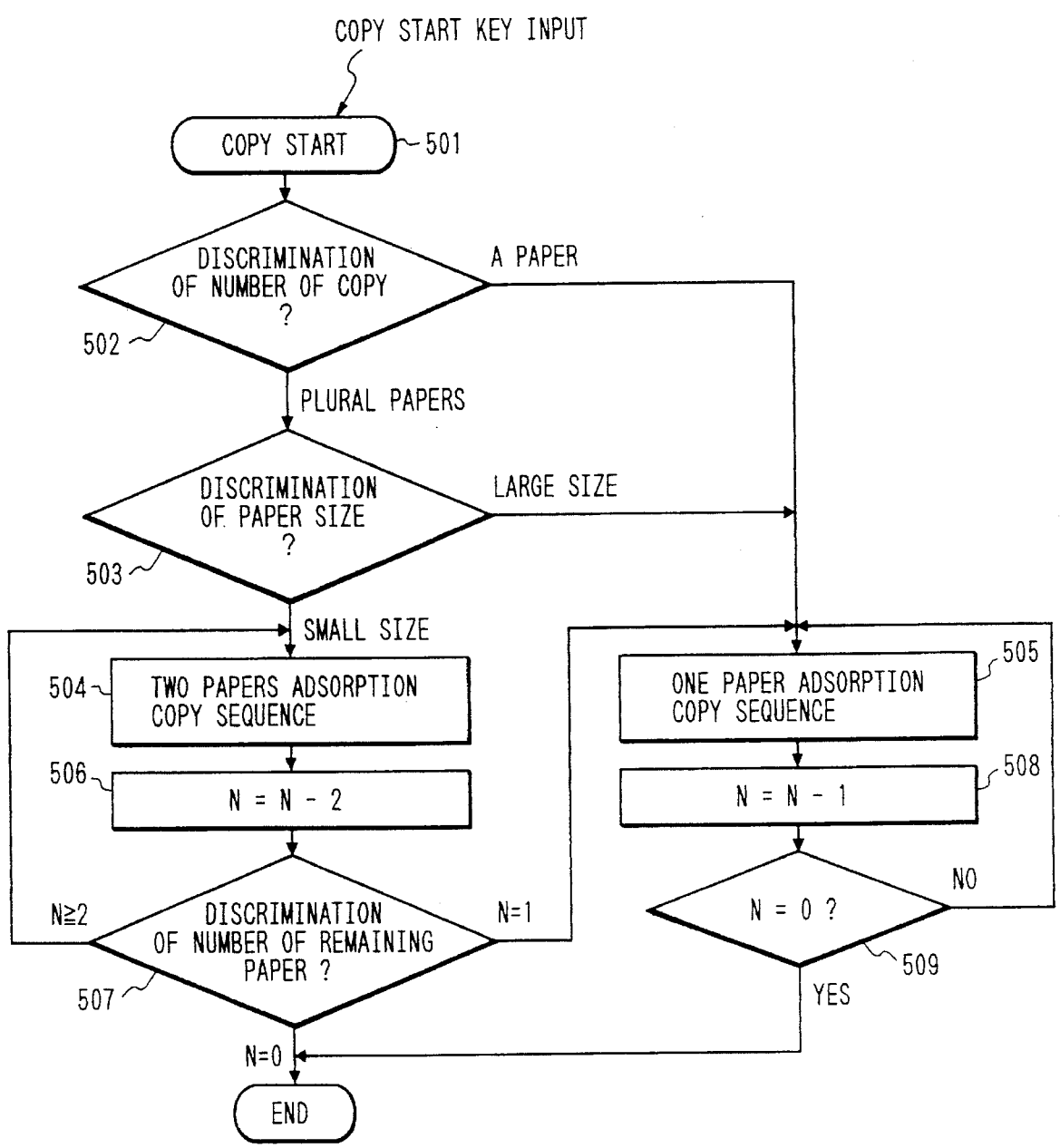
FIG. 5 is a control flow of the first embodiment.

FIG. 5 shows a control flowchart for the copying operation of the CPU 116. When the copy start key 406 of the operation unit 51 is inputted by the operator in step 501, the set number of copies (N) inputted by the ten-key of the operation unit 51 is judged in step 502. In the case where the number of copies (N) is a plural number, the size of paper to be used is judged in step 503.

When the number of copies is equal to a plural number and the paper size is a small size in the discriminating steps 502 and 503, a two paper adsorption copy sequence is executed in step 504. Now, "small size" denotes a paper size such that two papers of a size such as A4 size or letter size can be simultaneously adhered onto the transfer drum 27.

On the other hand, in the case where the paper size is the A3 size, B4 size, or leisure size and only one transfer paper can be wrapped around the transfer drum 27 or in the case where the number of copies is equal to 1 in spite of the small size, a one paper adsorption copy sequence is executed in step 505.

In case of the two paper adsorption copy sequence, two copies are formed per one rotation of the transfer drum 27. Therefore, 2 is subtracted from the copy number (N) in step 506 and the number of remaining copies is judged in step 507. When (N) is equal to or larger than 2, the two paper adsorption copy sequence is further executed in step 504. When the residual copy number (N) is equal to 1, one remaining copy is performed by the one paper adsorption copy sequence in step 505. When (N) is equal to 0, all of the copies have been finished.

In the case where the one paper adsorption copy sequence has been performed in step 505, 1 is subtracted from the copy number (N) in step 508. The remaining copy number is judged in step 509. When (N) =0, the copying operation is finished. When (N) is not equal to 0, the one paper adsorption copy sequence is again executed in step 505.

[Two paper adsorption copy sequence]

Figure 6:
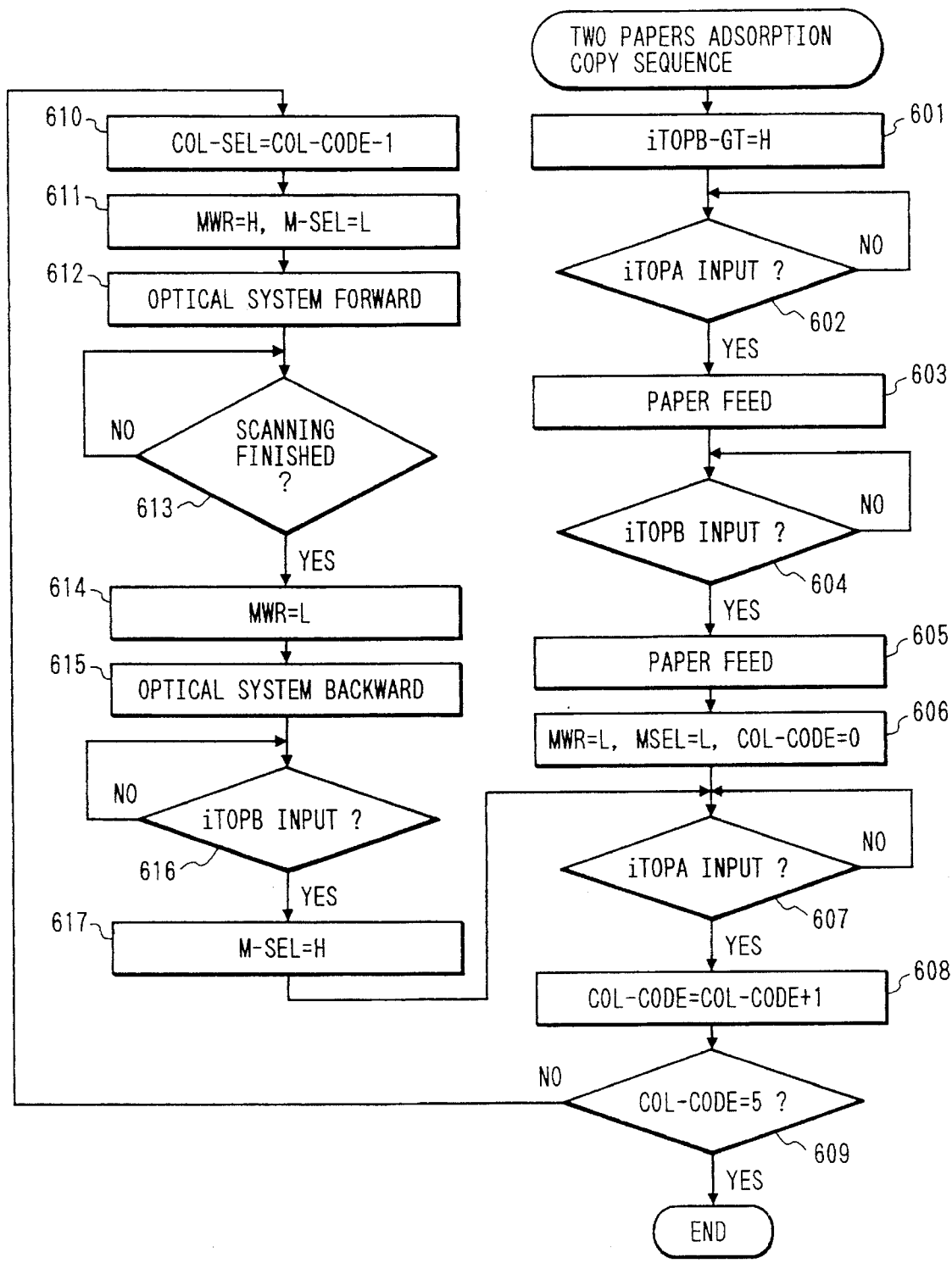
FIG. 6 is a control flowchart for a two paper adsorption copy sequence in the first embodiment.

FIG. 6 shows a control flowchart for a two paper adsorption copy sequence by the CPU 116.

In step 601, an ITOPB-GT signal is set to the (H) level. Thus, the OR of the ITOPA and ITOPB signals which are generated every half circumference of the rotation of the transfer drum 27 is calculated by the OR gate 306, so that the ITOP signal is derived and inputted to the CPU 116. The CPU 116 executes an adsorption control of two papers for the transfer drum 27 and an image output control for the two papers by the ITOP signal which is generated every half circumference of the transfer drum 27.

When the input of the ITOPA signal is detected in step 602, in step 603, the CPU 116 drives the pickup roller (32 or 33), paper feed roller (30 or 31), and resist roller 29 of the selected paper feeding stage by a PF (paper feed) signal from the I/O port 120 and the first transfer paper is adhered to the transfer drum 27. When the input of the next ITOPB signal is detected in step 604, the CPU 116 adheres the second transfer paper to the transfer drum 27 in step 605.

The two transfer papers are, consequently, adhered to the transfer drum 27 as shown in FIG. 3.

In step 606, the MWR signal and an M-SEL signal are set to the (L) level and 0 is inputted to a COL-CODE register (not shown) provided for an internal memory of the CPU 116.

In step 607, the apparatus waits for the ITOPA signal showing the image recording start timing for the first transfer paper adhered to the transfer drum 27. When the ITOPA signal is inputted, the value in the COL-CODE register is increased by only "1" in step 608. The COL-CODE register shows the recording color. Reference numeral 1 corresponds to magenta (M); 2 cyan (C); 3 yellow (Y); and 4 black (K).

In step 609, the COL-CODE register is checked, thereby discriminating whether the recording operations of four colors have been finished or not. When the value in the COL-CODE register lies within a range from 1 to 4, since the recording operations of four colors are not finished yet, the image is recorded after step 610.

In step 610, the value which is smaller than the value in the COL-CODE register by one is outputted as a COL-SEL signal and a predetermined color signal is selected by the selector 110. In step 611, the MWR signal is set to the (H) level, the read image signal READ-DT is recorded in the memory 111 by the CCD 14, and the M-SEL signal is set to the (L) level, thereby performing the image recording of the first paper by the READ-DT signal.

After completion of the preparation as mentioned above, in step 612, the motor 15 is driven by the optical system motor controller 117 and the optical system (original scanning unit 8 and a mirror unit 9) is moved forward. The image recording of the first paper is executed on the basis of the image signal READ-DT read by the CCD 14 and also the image signal READ-DT is stored in the memory 111. In step 613, the apparatus waits for the end of the original scanning of the distance corresponding to the paper size. In step 614, the MWR signal is set to the (L) level and the writing into the memory is finished.

After that, the operation for returning the optical system to the original reading start position is started in step 615. The apparatus waits for the ITOPB signal corresponding to the second paper in step 616. When the ITOPB signal is inputted, in step 617, the M-SEL signal is set to the (H) level and the image recording of the second page is performed on the basis of the image signal MEM-DT obtained by reading out the image signal written in the memory 111.

Figure 7:
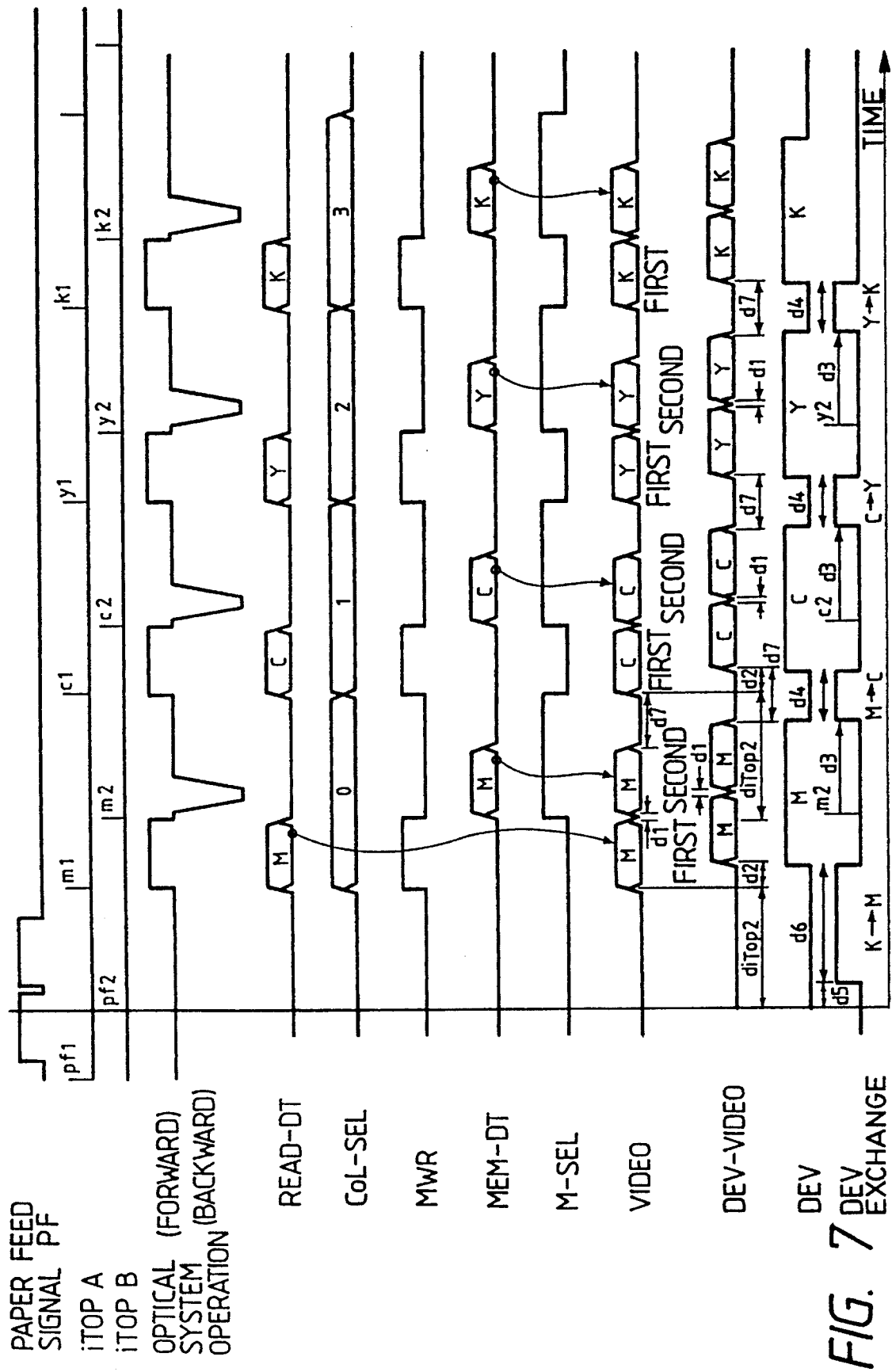
FIG. 7 is a timing chart for the two paper adsorption copy sequence in the first embodiment.

FIG. 7 shows operation timings of respective sections when the image recording of two papers is executed by the two paper adsorption copy sequence for the papers of a small size.

As will be understood from the timing charts, in the case where the paper size is small, the image signal READ-DT is selected as an image recording signal VIDEO for the first transfer paper adhered to the transfer drum 27 and the MWR signal is set to the (H) level, thereby writing the image signal READ-DT into the memory 111. For the second transfer paper, the image signal used for the image recording of the first paper is read out as MEM-DT from the memory 111 and the image recording for the second transfer paper is executed by using the MEM-DT signal as an image signal VIDEO for recording.

A DEV-VIDEO signal in FIG. 7 shows the timing when the electrostatic latent image formed on the photosensitive drum 19 on the basis of the VIDEO signal comes to the developing position PS in FIG. 3. In this instance, reference character d2 denotes a time which is required for the electrostatic latent image formed at the laser beam irradiating position PL in FIG. 3 to arrive at the developing position PS.

A DEV EXCHANGE in FIG. 7 shows a timing of an exchanging control of the developer.

The CPU 116 drives the developer moving motor 119 by the developer motor controller 118 after the elapse of a predetermined time d5 from the ITOPB signal (pf2) before the ITOPA signal (m1) for reading the magenta image is inputted, thereby moving the magenta developer 5d to the developing position PS. In this instance, a time which is required to exchange the black developer 5a used at the end of the previous copy sequence to the magenta developer 5d assumes d6. The CPU 116 controls the movement of the developer 5 for the time d6 which is shorter than the time obtained by adding a time dITOP2 from ITOPB (pf2) to the next ITOPA (m1) and the time d2 until the head of the magenta electrostatic latent image of the first paper comes to the developing position PS.

When the magenta developer 5d is exchanged to the cyan developer 5c, the developer moving motor 119 is driven for the d4 time after the elapse of a d3 time since the ITOPB signal (m2) synchronized with the image recording of the second paper of magenta had been inputted, thereby moving the cyan developer 5c to the developing position PS.

The moving distance of the developer from magenta to cyan is equal to ⅓ of the moving distance from black to magenta, so that the time d4 which is needed for moving (exchanging) is also equal to ⅓ of d6.

The time d3 corresponds to a time which is obtained by subtracting the time d4 which is required to move the developer from the time derived by adding the time dITOP2 from ITOPB to ITOPA and d2 [time from ITOPB (m2) to the start of the development of cyan].

The CPU 116 similarly moves the yellow developer 5b to the developing position after the elapse of the d3 time from the input of the ITOPB signal (c2) of cyan.

Further, the CPU 116 moves the black developer 5a to the developing position after the elapse of the d3 time from the input of the ITOPB signal (y2) of yellow.

Such a developer moving control is shown in the column of DEV EXCHANGE in FIG. 7. The developers which are used in correspondence to the electrostatic latent images of respective colors are shown in the column of DEV in FIG. 7.

In the two paper adsorption copy sequence in the embodiment, as shown in FIG. 3, the recording papers are adhered to the transfer drum at the paper intervals PI1 and PI2. As shown in FIG. 7, the developers are exchanged by using a longer time d7 between the times d1 and d7 corresponding to the respective paper intervals.

In the case where two papers are uniformly adhered to the transfer drum, the time which can be used for exchanging the developers are equal to (d1+d7)/2 which is shorter than the time d7.

In the embodiment, the paper intervals on the transfer drum are set to be uneven and the developer is moved by using the longer interval, thereby obtaining a surplus time to drive the developer.

When the paper intervals are set to be uneven as mentioned above, it is difficult to drive the original reading optical system in correspondence to each of the two papers adhered to the transfer drum. This is because the optical system has to be returned to the original reading start position within the times d1 and d7 corresponding to the paper intervals in order to drive the optical system in correspondence to two papers, and because the paper interval PI1, however, is set to a value as short as possible in order to assure the driving time of the developer.

In the embodiment, consequently, two small papers are adhered to the transfer drum at uneven intervals, the image of the first paper is recorded by using the image signal read out by moving the original reading optical system, and the read image signal is stored in the memory. The image recording of the second paper is performed by reading out the image signal used for the image recording of the first paper from the memory. By executing the image recording of the second paper on the basis of the image signal read out from the memory as mentioned above, as shown by the optical system operation in FIG. 7, the original reading optical system is used as a time to return the optical system to the reading start position during the recording of the image of the second paper. It is, consequently, unnecessary to return the reading optical system to the original reading start position in a time d1 corresponding to the narrower paper interval PI1.

In the embodiment, the small size in which the reading scan length is maximum is the letter size. The reading scanning length is equal to 216 mm. That is, as a memory capacity, it is sufficient to prepare the capacity corresponding to the maximum size among the sizes which are equal to or less than the maximum value 216 mm of the scanning length in which the optical system cannot successively read.

Since the image recording is performed at a resolution of 400 lines per inch in both of the main scanning direction (electrical scanning direction by the CCD) and the sub-scanning direction (reading scanning direction by the movement of the optical system) in the embodiment, a memory capacity of 14,960,000 pixels is needed for the letter size (main scan 279.4 mm, sub scan 216 mm) and a memory capacity of 15,460,000 pixels is needed for the A4 size (main scan 297 mm, sub scan 210 mm). The memory capacity for the A4 size is, therefore, prepared as a memory size. [One paper adsorption copy sequence]

Figure 8:
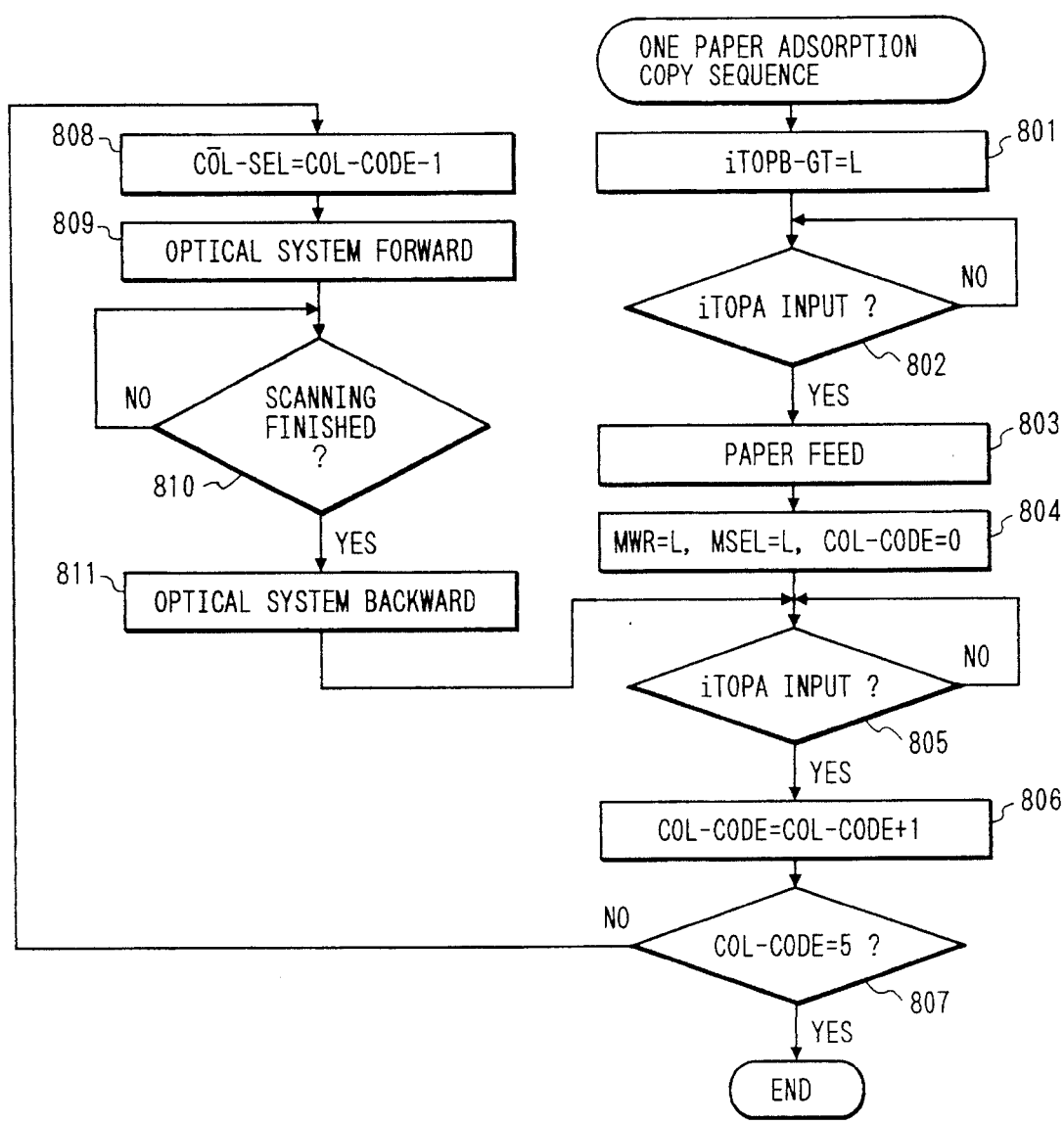
FIG. 8 is a control flowchart for a one paper adsorption copy sequence in the first embodiment.

FIG. 8 shows a control flow of a one paper adsorption copy sequence by the CPU 116.

In step 801, the ITOPB-GT signal is set to the (L) level, so that the ITOPA signal which is generated every circumference of the rotation of the transfer drum 27 is inputted to the sub-scanning address counter 115. The CPU 116 executes the adsorption control of one transfer paper for the transfer drum 27 and the image output control for one transfer paper by the CPU 116 by the ITOPA signal of each circumference of the transfer drum 27.

When the input of the ITOPA signal is detected in step 802, in step 803, the CPU 116 drives the pickup roller (32 or 33), paper feed roller (30 or 31), and resist roller 29 of the selected paper feeding stage by the PF signal from the I/O port 120 and the transfer paper of a large size is adhered onto the transfer drum 27.

The head of one transfer paper is adhered at the same position as the head of the transfer paper 63-a in FIG. 3 on the transfer drum 27.

In step 804, the MWR and M-SEL signals are set to the (L) level and 0 is stored in the COL-CODE register (not shown) provided for the internal memory in the CPU 116.

In step 805, the apparatus waits for the ITOPA signal showing the image recording start timing for the transfer paper adhered to the transfer drum 27. When the ITOPA signal is inputted, the value in the COL-CODE register is increased by only "1" in step 806.

In step 807, the COL-CODE register is checked, thereby judging whether the recording operations of four colors have been finished or not. When the value of the COL-CODE lies within a range from 1 to 4, the image recording is executed after step 808.

First in step 808, the value which is smaller than the value in the COL-CODE register by one is outputted as a COL-SEL signal and a predetermined color signal is selected by the selector 110. In step 809, the motor 15 is driven by the optical system motor controller 117, the optical system is moved forward, and the image recording of the first paper is executed on the basis of the image signal READ-DT read by the CCD 14. In step 810, the apparatus waits for the end of the original scanning of the distance corresponding to the transfer paper size. The operation to return the optical system to the original reading start position is started in step 615.

Figure 9:
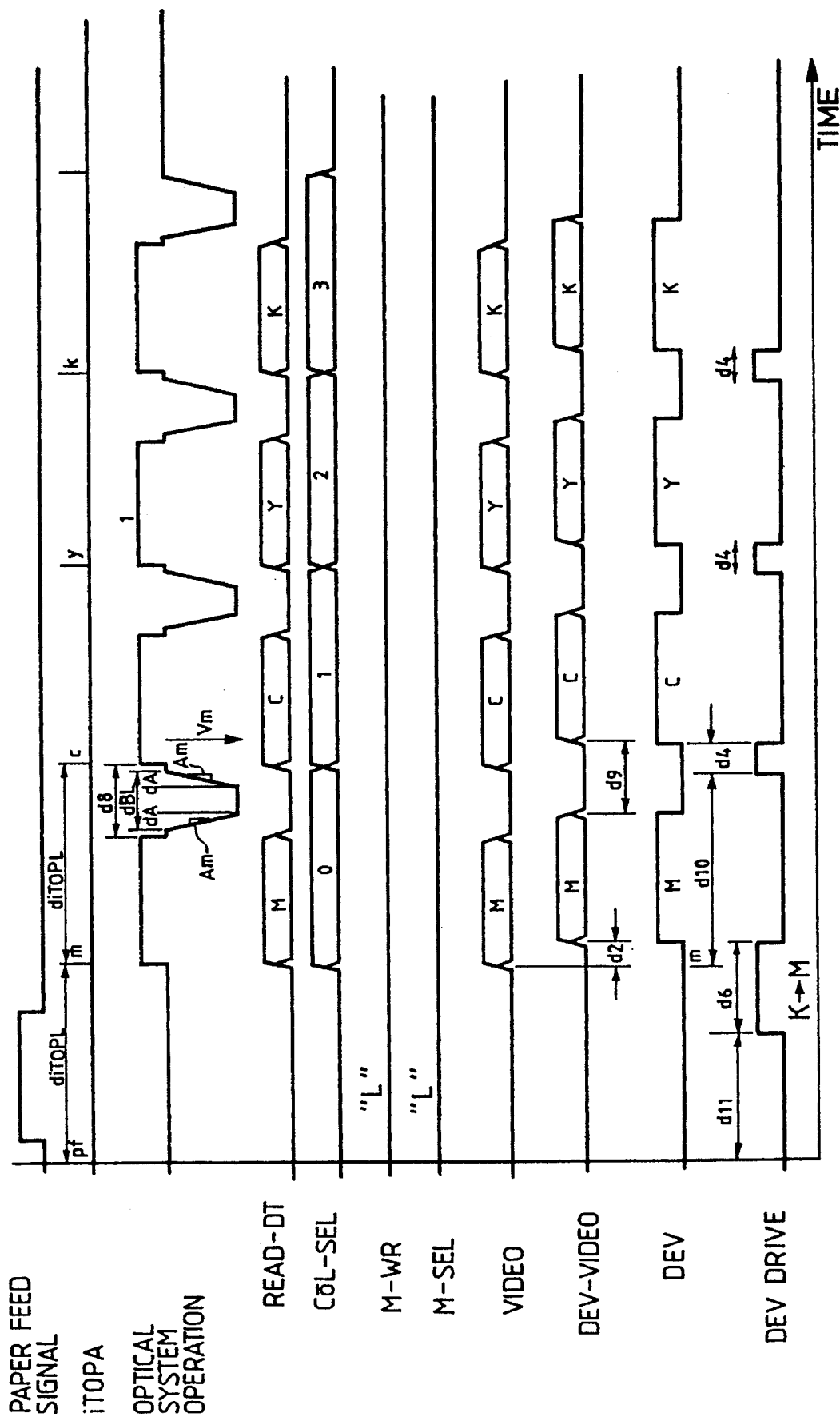
FIG. 9 is a timing chart for the one paper adsorption copy sequence in the first embodiment.

FIG. 9 shows the operation timings of respective sections when the image recording is performed by the one paper adsorption copy sequence for a transfer paper of a large size. In the diagram, the timings which are equivalent to the operation timings of the small paper in FIG. 7 are shown by the same reference characters.

The DEV DRIVE in FIG. 9 shows the control timing for an exchange of the developers.

The CPU 116 drives the developer moving motor 119 by the developer motor controller 118 after the elapse of a predetermined time d11 from the ITOPA signal (pf) before the ITOPA signal (m) for reading the magenta image is inputted, thereby moving the magenta developer 5d to the developing position PS. In this instance, the time which is required to move the magenta developer 5d in place of the black developer 5a used at the end of the previous copy sequence to the developing position is equal to d6 in a manner similar to the case of the small paper.

The CPU 116 executes the moving control of the developer by setting the time, as a foregoing time d11, obtained by subtracting the time d6 necessary to move the developer from the time obtained by adding the time d2 which is required for the head of the electrostatic latent image of magenta reached the developing position PS from the ITOPA (m) and the interval dITOPL of the ITOPA of one circumference of the transfer drum 27. When the magenta developer is exchanged to the cyan developer, the developer moving motor is driven for the d4 time after the elapse of d10 time after the ITOPA signal (m) synchronized with the magenta image recording had been inputted, thereby moving the cyan developer 5c to the developing position PS.

The moving distance of the developer to exchange from the magenta developer to the cyan developer is the same as that in the case of the paper of the small size.

Therefore, the CPU 116 moves the cyan developer 5c to the developing position after the elapse of the d10 time from the input of the ITOP signal (m) of magenta. The time d10 is a time which is obtained by subtracting the time d4 that is required for movement of the developer from the time [time from the ITOP (m) to the start of the development of cyan] obtained by adding the ITOP period dITOPL and d2.

Similarly, the CPU 116 moves the yellow developer 5b to the developing position after the elapse of the d10 time from the input of the ITOP signal (c) of cyan.

Further, the CPU 116 moves the black developer 5a to the developing position after the elapse of the d10 time from the input of the ITOP signal (y2) of yellow.

The developer which is used in correspondence to the electrostatic latent image of each color by such a moving control of the developers as mentioned above is shown in the column of DEV in FIG. 9.

Since the image recording is executed on the basis of the image signal read out from the original by the one paper adsorption copy sequence, after the original was read every recording color, the optical system is returned to the reading start position.

[Second embodiment]

Figure 10:
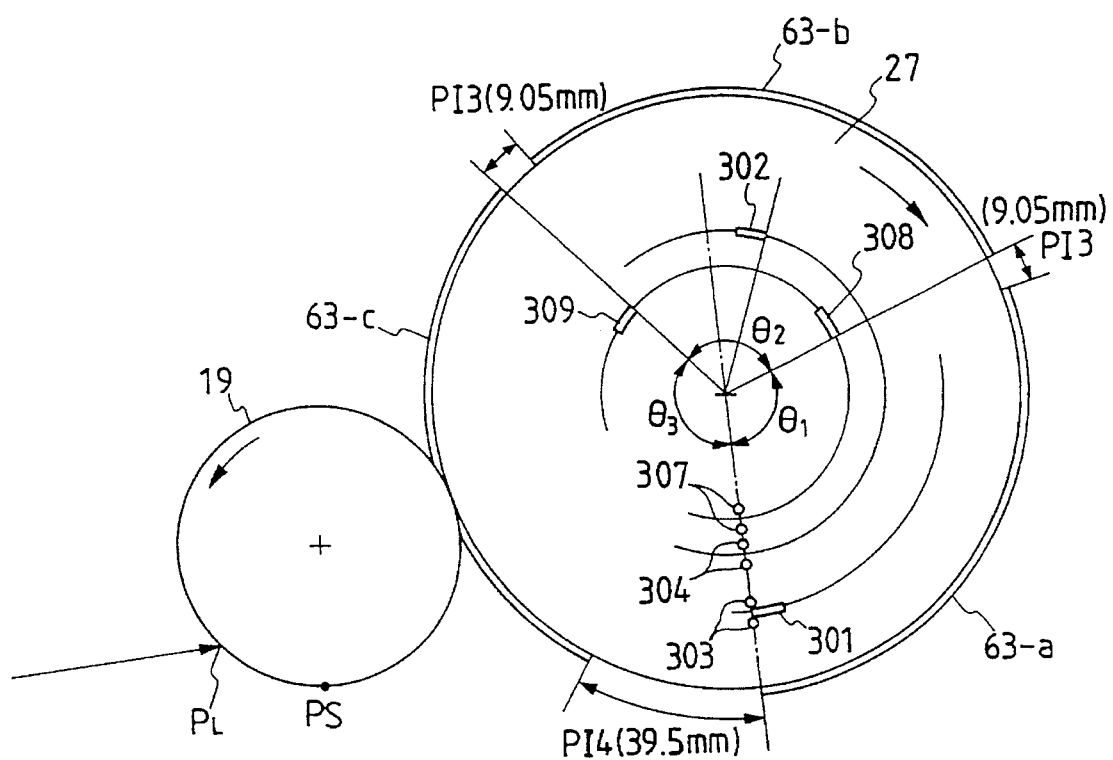
FIG. 10 is a detailed diagram of a transfer drum in the second embodiment.

FIG. 10 shows the relation between the photosensitive drum 19 and the transfer drum 27 in the second embodiment using the invention. The second embodiment is constructed in a manner such that up to three transfer papers are adhered onto the surface of the transfer drum 19 in a color copying apparatus with a construction similar to that of the first embodiment. The transfer drum 27 and photosensitive drum 19 have constructions similar to those in the first embodiment. A diameter of the transfer drum 27 is equal to 160 mm and its circumference is equal to 502.6 mm. The photosensors 303 and 304 and flags 301 and 302 are also provided to detect timings of the front edges of the papers of a large size and a small size in a manner similar to the first embodiment. In the second embodiment, in addition to them, up to three transfer papers are adhered onto the transfer drum 27, thereby recording a color image for the three transfer papers.

Each of the three papers which can be simultaneously adhered has a size such that the length regarding the rotating direction of the transfer drum 27 is shorter than 167.5 mm of ⅓ of the circumference of the transfer drum. For example, such a paper size corresponds to the case where the paper in the short-side direction (148.5 mm) of the A5 size is adhered in the circumferential direction of the transfer drum 27, or the like.

FIG. 10 shows a state in which three papers of the A5 size are adhered onto the transfer drum at uneven intervals in the circumferential direction of the transfer drum. The CPU 116 executes an adsorption control of the papers on the basis of the ITOP signals from the photosensor 303 and a photosensor 307. The paper 63-a is adhered at the position corresponding to the flag 301 on the transfer drum. The paper 63-b is adhered at the position corresponding to a flag 308 on the transfer drum. A paper 63-c is adhered at the position corresponding to a flag 309 on the transfer drum.

When a mutual angle interval of the three flags 301, 308, and 309 is equal to $2\pi/3$ radian, those three flags are located at regular intervals. In the embodiment, however, an angle ($\theta_1$) between the flags 301 and 308 and an angle ($\theta_2$) between the flags 308 and 309 are set to be narrower than $2\pi/3$ radian by 0.125 radian. An angle ($\theta_3$) between the flags 309 and 301 is set to ($2\pi/3+0.25$) wider than the other two intervals.

Namely, the circumferential length of the transfer drum corresponding to $\theta_2$ is equal to 157.55 mm. The circumferential length on the transfer drum corresponding to $\theta_3$ is equal to 187.55 mm. Since the short side (148.5 mm) of the paper of the A5 size is adhered in the circumferential direction of the transfer drum, a paper interval PI3 is equal to 9.05 mm and a paper interval PI4 is equal to 39.5 mm.

Figure 11:
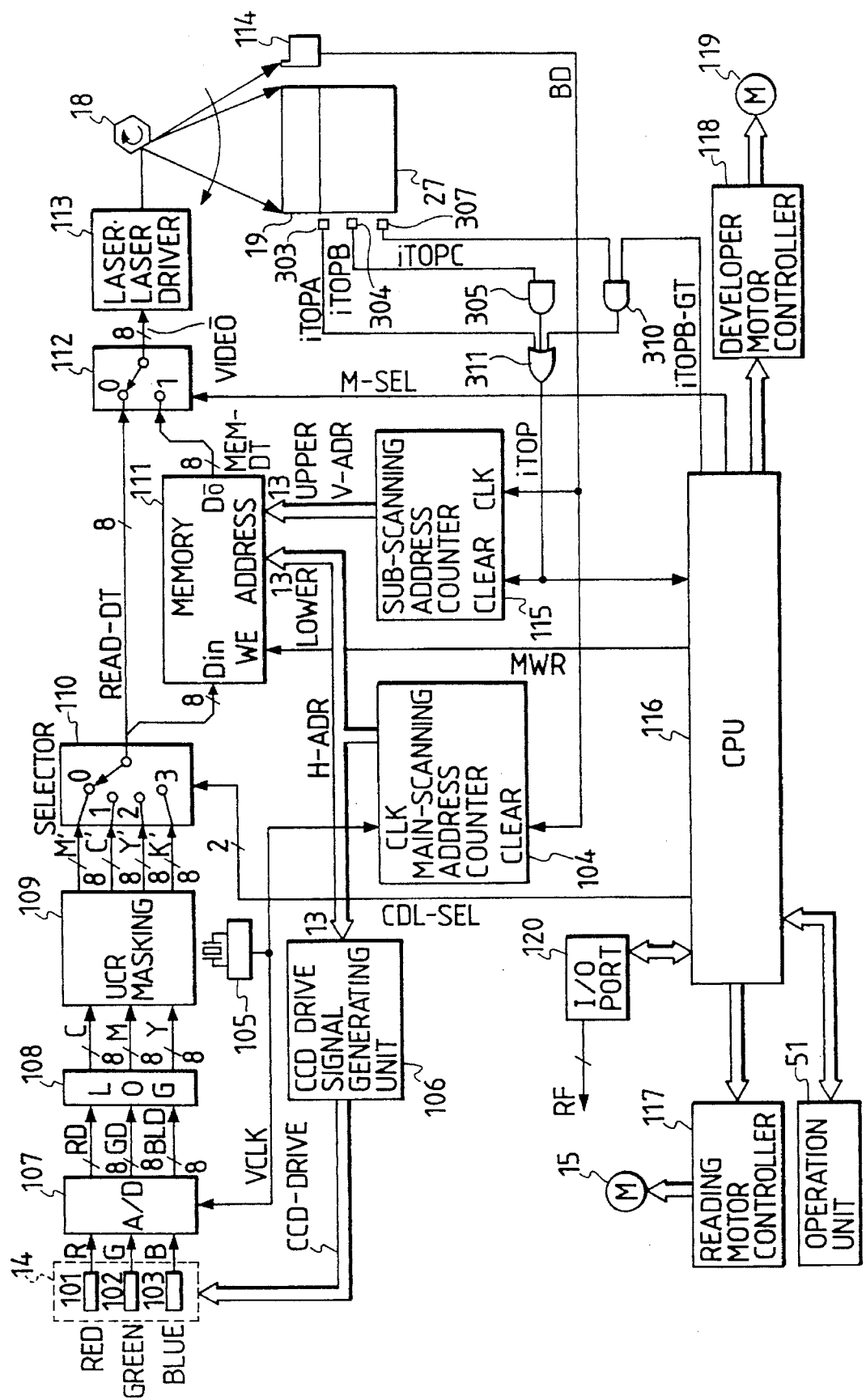
FIG. 11 is a control section in the second embodiment of the invention.

FIG. 11 shows a construction of a control unit in the embodiment. FIG. 11 has a construction that is fundamentally the same as FIG. 1 except the following point. Namely, an AND gate 310 and an OR gate 311 are provided. The AND gate 310 receives an ITOPC signal from the photosensor 307 for detecting the front edge of the third transfer paper and a selection signal ITOPC-GT from a port of the CPU 116. The OR gate 311 calculates the OR of an output of the AND gate 305 and an output of the AND gate 310, thereby generating the ITOP signal. In the above construction, when the ITOPC-GT signal is set to the L level, the one paper adsorption copy sequence and the two paper adsorption copy sequence which have been described in the first embodiment can be realized by the same control.

A three paper adsorption copy sequence in which three transfer papers are adhered onto the surface of the transfer drum 27 will now be described.

(Three paper adsorption copy sequence)

Figure 12:
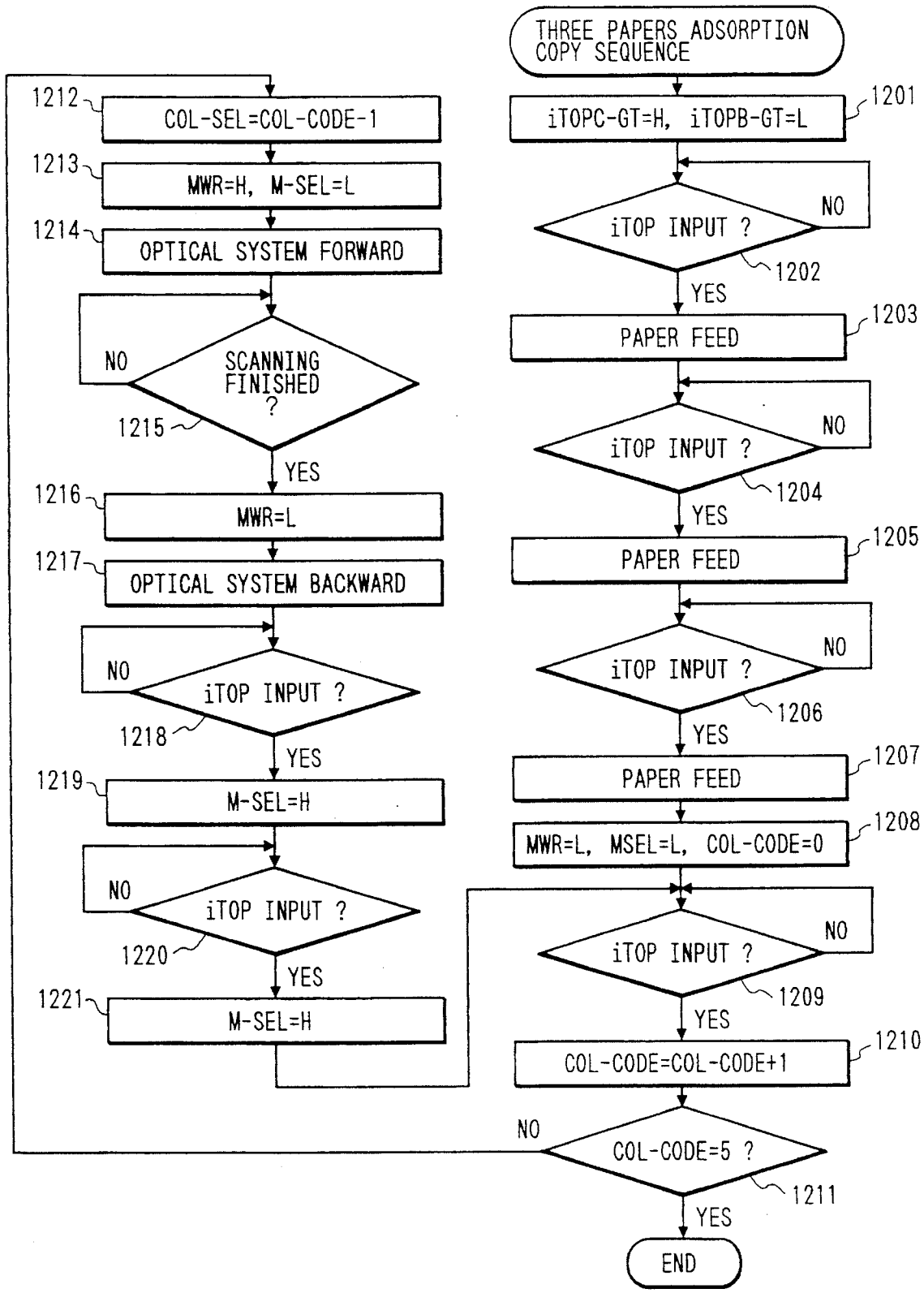
FIG. 12 is a control flowchart for a three paper adsorption copy sequence in the second embodiment.

FIG. 12 shows a control flow for the three paper adsorption copy sequence by the CPU 116.

In step 1201, the ITOPB-GT signal is set to the L level and the ITOPC-GT signal is set to the H level. Thus, in association with the rotation of the transfer drum 27, the OR of the ITOPA signal and ITOPC signal is calculated by the gate 311 by the passages of the flags 301, 308, and 309 and the ITOP signal is generated from the gate 311 and is inputted to the CPU 116. The CPU 116 executes an adsorption control of three transfer papers for the transfer drum 27 and an image output control for the three transfer papers by the ITOP signal which is generated three times every circumference of the transfer drum 27.

When the input of the ITOP signal is detected in step 1202, the CPU 116 drives the pickup roller (32 or 33), feed roller (30 or 31), and resist roller 29 of the selected paper feed stage by the PF signal from the I/O port 120 in step 1203, thereby adhering the first transfer paper onto the transfer drum 27. When the input of the next ITOP signal is detected in step 1204, the CPU 116 allows the second transfer paper to be adhered onto the transfer drum in step 1205.

When the input of the next ITOP signal is detected in step 1206, the CPU 116 allows the third transfer paper to be adhered onto the transfer drum 27 in step 1207.

Thus, the three transfer papers are adhered onto the transfer drum 27 as shown in FIG. 10.

Subsequently, in step 1208, the MWR signal and M-SEL signal are set to the L level and 0 is stored into a COL-CODE register (not shown) provided in the internal memory 111 of the CPU 116.

By waiting the ITOP signal in step 1209, the image recording start timing for the first transfer paper adhered on the transfer drum 27 is discriminated. When the ITOP signal is inputted, the value in the COL-CODE register is increased by only "1" in step 1210.

The value in the COL-CODE register is checked in step 1211, thereby judging whether the recording operations of four colors have been finished or not. When the value in the COL-CODE register lies within a range from 1 to 4, since the recording operations of four colors are not yet finished, the image recording is executed after step 1212.

In step 1212, the value that is smaller than the value in the COL-CODE register by "1" is outputted as a COL-SEL signal and a predetermined color signal is selected by the selector 110. The MWR signal is set to the H level in step 1213 and the image signal READ-DT read by the CCD 14 is recorded into the memory 111. The M-SEL signal is set to the L level, thereby executing the image recording of the first paper on the basis of the image signal READ-DT. After completion of the preparation as mentioned above, the motor 15 is driven by the reading motor controller 117 in step 1214, thereby moving the optical system forward. The image recording of the first paper is performed on the basis of the image signal READ-DT read by the CCD 14 and the image signal READ-DT is stored into the memory 111.

The apparatus waits for the end of the original scanning of the distance corresponding to the paper size in step 1215. In step 1216, the MWR signal is set to the L level, thereby finishing the storage into the memory. After that, the operation to return the optical system to the original reading start position is started in step 1217. In step 1218, the apparatus waits for the ITOP signal corresponding to the second transfer paper. When the ITOP signal is inputted, the M-SEL signal is set to the H level in step 1219 and the image recording of the second paper is executed on the basis of the image signal MEM-DT by which the image signal stored in the memory 111 was read out.

In step 1220, the apparatus waits for the ITOP signal corresponding to the third transfer paper. When the ITOP signal is inputted, the M-SEL signal is again set to the H level in step 1221 and the image recording of the third paper is executed on the basis of the image signal MEM-DT by which the image signal stored in the memory 111 was read out.

Figure 14:
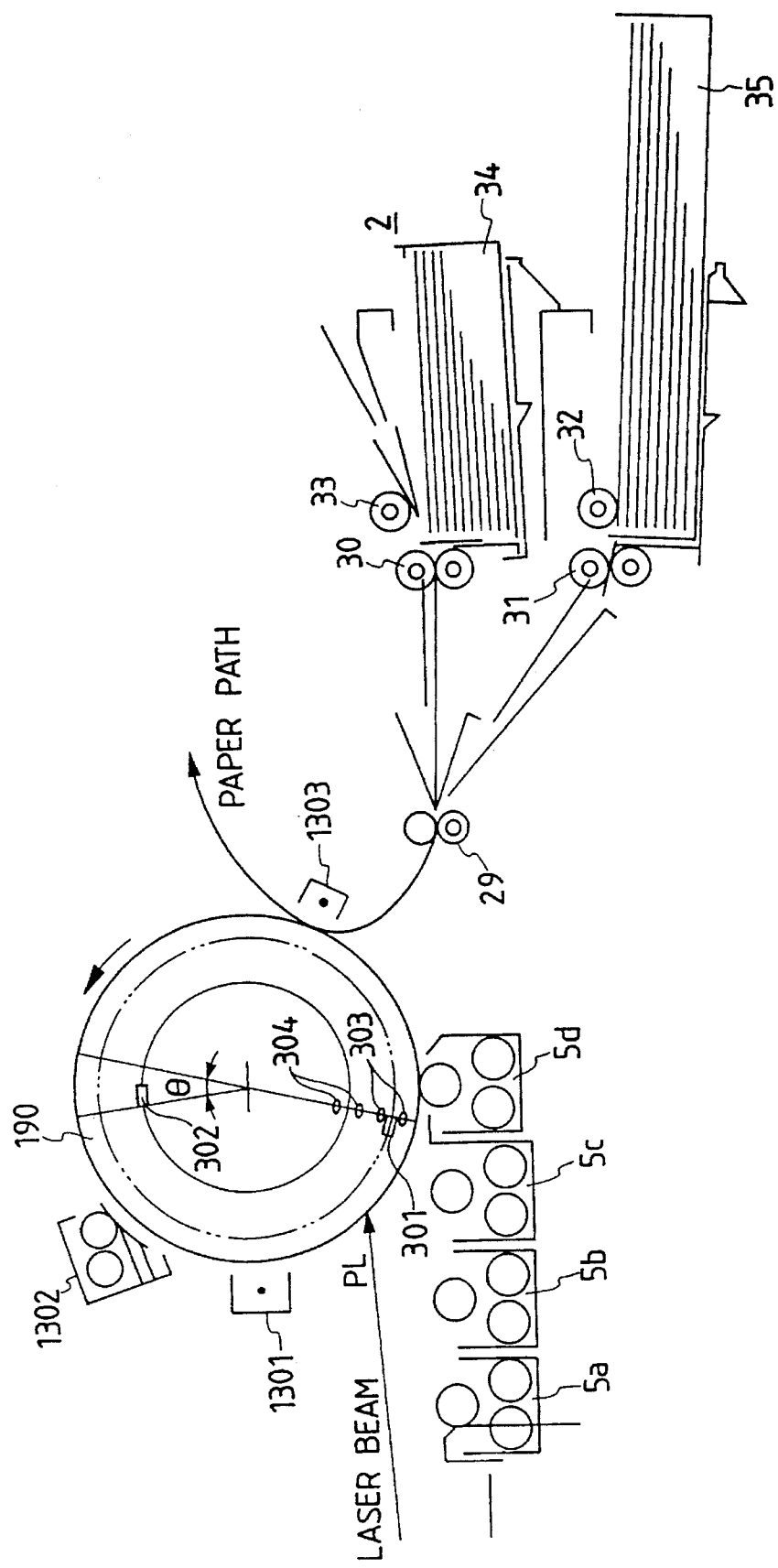
FIG. 14 is a schematic diagram of the third embodiment of the invention.
Figure 15:
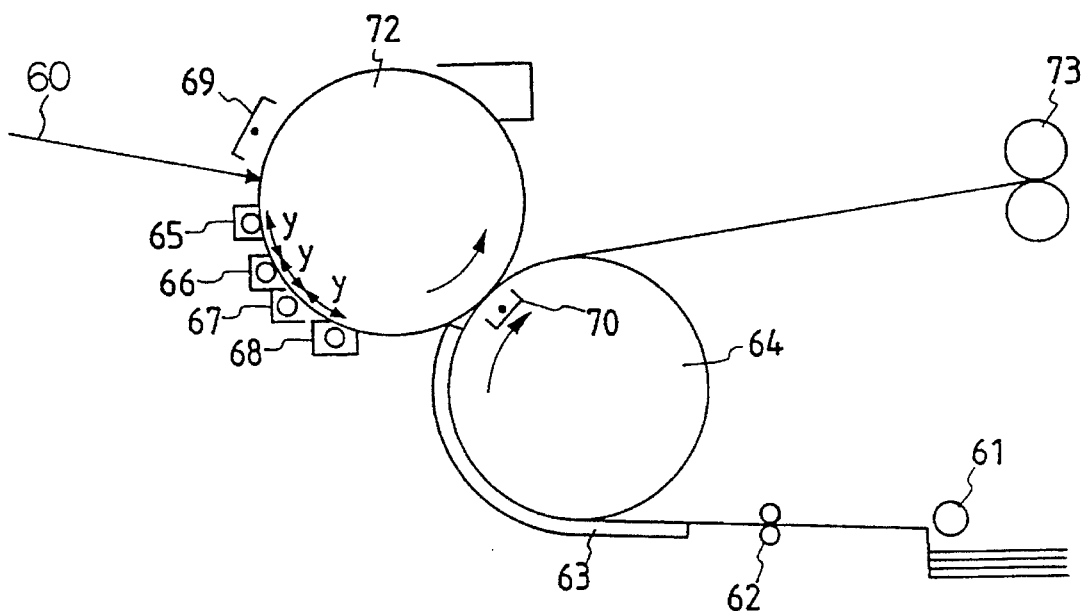
FIG. 15 is a diagram for explaining a conventional example.
Figure 16:
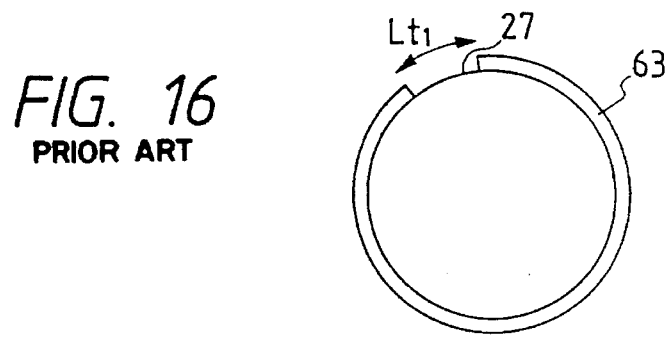
FIG. 16 is a diagram for explaining a conventional example.
Figure 17:
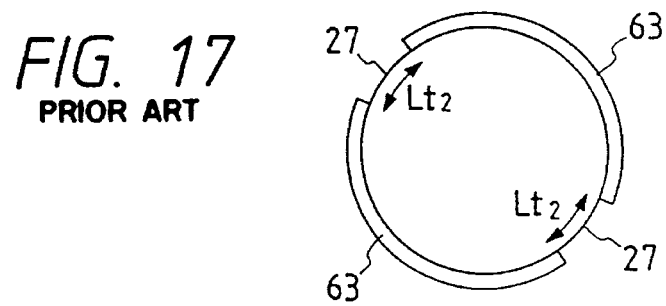
FIG. 17 is a diagram for explaining a conventional example.

FIG. 14 shows an operation timing of each section when the image recording operations of three papers are simultaneously executed by the three paper adsorption copy sequence.

In a manner similar to the two paper adsorption copy sequence of the first embodiment, the image signal READ-DT read by the CCD by moving the optical system is selected as an image recording signal for the first paper adhered on the transfer drum and the MWR signal is set to the H level, thereby writing the image signal READ-DT into the memory 111. For the second and third copy papers, the image signal used for the image recording of the first paper is read out as MEM-DT from the memory 111 and the image recording for the second paper is executed while using the MEM-DT signal as an image signal VIDEO for recording.

Figure 13:
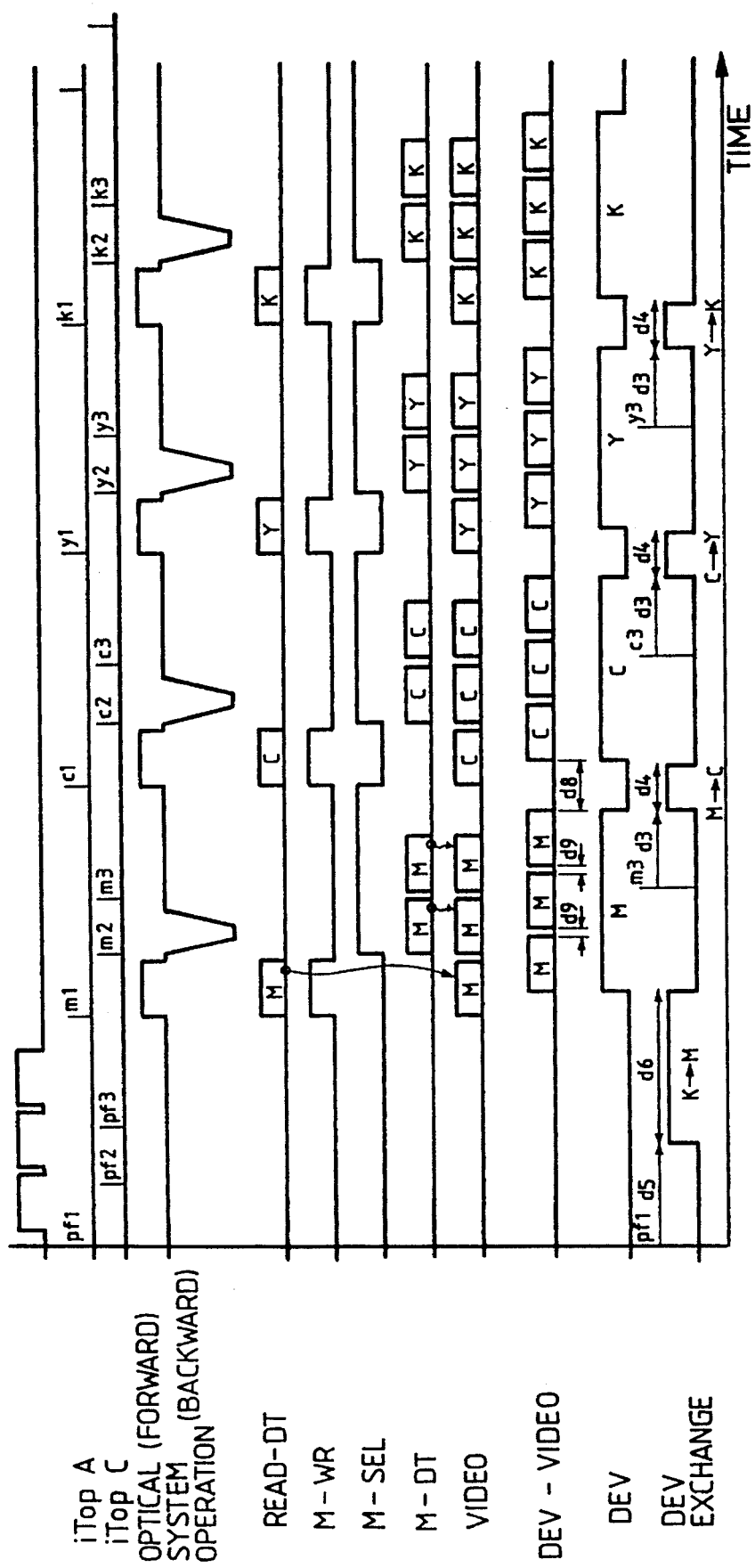
FIG. 13 is a timing chart of the second embodiment.

The DEV-VIDEO signal in FIG. 13 shows a timing at which the electrostatic latent image formed on the photosensitive drum by the VIDEO signal comes to the developing position PS in FIG. 3. The CPU 116 drives the developer moving motor 119 by the developer motor controller 118 for the d6 time after the elapse of the d5 time from the input of the ITOPA signal (pf1) before the ITOPA signal (m1) for reading the magenta image is inputted, thereby moving the magenta developer 5d to the developing position PS.

When the magenta developer is exchanged to the cyan developer, the developer moving motor is driven for a d4 time after the elapse of the d3 time after the ITOPC signal (m3) synchronized with the image recording of the third paper of magenta had been inputted, thereby moving the cyan developer 5c to the developing position PS.

Similarly, the CPU 116 exchanges the cyan developer 5c to the yellow developer 5b after the elapse of the d3 time from the input of the ITOPC signal (c3) of cyan.

Further, the CPU 116 exchanges the yellow developer 5b to the black developer 5a after the elapse of the d3 time from the input of the ITOPC signal (y3) of yellow.

Such a moving control of the developers is shown in the column of the DEV EXCHANGE in FIG. 13. The developer which is used in correspondence to the electrostatic latent image of each color is shown in the column of DEV in FIG. 13.

In the embodiment, in a manner similar to the two paper adsorption copy sequence, the developers are exchanged by using an electrostatic latent image interval time d8 corresponding to the interval PI4 between the third paper and the next first paper.

In the case where the three papers are uniformly adhered onto the transfer drum, a time which can be used to exchange the developers is equal to (d9+d9+d8)/3 and is shorter than d8. d9 denotes an electrostatic latent image interval time corresponding to the paper interval PI3 in FIG. 10.

In the embodiment as well, in a manner similar to the first embodiment, the paper intervals on the transfer drum are made uneven, the interval between the third image and the next first image is set to be wider than the other intervals, and the developers are exchanged by using such a time, thereby providing a surplus time for driving the developer.

By unevenly setting the paper intervals as mentioned above, it is further difficult to drive the original reading optical system as a generating source of the image information in correspondence to each of the three papers adhered on the transfer drum than the first embodiment.

Therefore, in the embodiment as well, three papers are also unevenly adhered on the transfer drum and the first image is recorded on the basis of the image signal read by moving the original reading optical system. In the image recording of the second and subsequent papers, the image signal used for the image recording of the first paper is read out from the memory and the image recording is executed. This makes it unnecessary to return the reading optical system to the original reading start position at a high speed at the narrow paper interval PI3 (time d9).

By increasing the number of flags of the transfer drum, four or more images can be also formed.

[Third embodiment]

In the above embodiment, the operation of a plurality of copies using the memory in the color copying apparatus using the transfer drum has been described. However, the invention can be also applied to a color copying apparatus of the color overlap developing system such that the toners of M, C, Y, and K are sequentially overlapped on the photosensitive drum of a large diameter and are developed without using the transfer drum and the toner images of four colors on the drum are copy transferred onto a recording paper in a lump.

FIG. 14 shows an apparatus in which a photosensitive drum 190 of the same diameter as that of the transfer drum 27 in the first embodiment is used and color images corresponding to two transfer papers of a small size are formed on the photosensitive drum 190.

Reference numeral 1301 denotes a primary charging device and 1302 indicates a cleaner which can be come into contact with or removed from the photosensitive drum 190. The flags 301 and 302 are attached at the positions which are deviated by only the angle $(\pi+\theta)$ from the rotational center of the photosensitive drum 190 and are rotated together with the drum 190. The photosensors 303 and 304 detect the passages of the flags 301 and 302, the photosensor 303 generates the ITOPA signal, and the photosensor 304 generates the ITOPB signal. The photosensors 303 and 304 function in substantially the same manner as those provided for the transfer drum 27 in the first embodiment.

First, when the ITOPA signal from the photosensor 303 is inputted, in a manner similar to the first embodiment, the optical system is driven, a latent image of the first paper is formed from the position corresponding to the flag 301 on the photosensitive drum by using the read signal and is developed by using the magenta developer 5d, and the image signal at that time is stored into a memory similar to that in the first embodiment. When the ITOPB signal from the photosensor 304 is inputted, the image signal used for the image formation of the first paper is read out from the memory. A magenta latent image of the second paper is formed from the position corresponding to the flag 301 on the photosensitive drum and is developed, and the optical system which was moved forward for reading the image of the first paper is returned to the scanning start position.

By repeating those operations in correspondence to the developing colors of cyan, yellow, and black, color toner images of four colors of two papers are overlapped and formed on the photosensitive drum. For such a period of time, the cleaner 1302 is away from the surface of the photosensitive drum. After that, two papers of a small size are fed from the cassette 34 synchronously with the ITOPA and ITOPB signals. The color toner images of four colors of the two papers overlapped on the photosensitive drum are copy transferred onto different papers by a transfer charging device 1303, so that two color images are derived in a manner similar to the first embodiment.

As will be obviously understood from the above description, according to the embodiment, all of the functions of the transfer drum and photosensitive drum in the first embodiment are provided for the photosensitive drum. Namely, in a manner similar to the first embodiment, the image signal of the first paper is read out from the memory and is used for image recording of the second paper of the small size, thereby making it unnecessary to execute a high-speed returning operation of the reading optical system.

In the embodiment as well, the attaching position of the flag 302 for generating a sync signal of the recording image of the second paper is located ahead by $\theta$ radian than $\pi$ radian (half rotation) from the flag 301 for generating a sync signal of the recording image of the first paper as shown in the diagram.

Namely, in a manner similar to the first embodiment, the interval between the rear edge of the second image which is formed on the photosensitive drum 19 and the front edge of the next one image is set to be wider than the interval between the rear edge of the first image and the front edge of the second image. By exchanging the developers within the time corresponding to such a wide image interval, an exchanging speed of the developers can be suppressed to a slow speed.

In the embodiment as well, by providing three or more flags synchronized with the photosensitive drum, the color image recordings of three or more papers similar to those in the second embodiment can be simultaneously executed.

[Other embodiments]

In the above description, a plurality of flags synchronized with the transfer drum and photosensitive drum have been used as sync signals for the recording of a plurality of papers. However, such flags are not limited to the optical detecting means used in the description so far but can use other means so long as it detects that the rotation of the drum has reached a predetermined position. For example, in place of the flags, it is also possible to count a time corresponding to the distance between the flags by a timer counter and to generate a pseudo sync signal.

As a recording apparatus to which the invention can be applied, an apparatus using an intermediate transfer material in place of the transfer drum can be also used. The invention is not limited to the image recording apparatus for sequentially color recording every separation color as used in the description but can be also applied to any other apparatus which can simultaneously form images of a plurality of colors. In this case, image data of a plurality of colors which are recorded simultaneously is stored in the memory and the image data is simultaneously read out every plurality of colors.

The invention is not limited to the color copying apparatus but can be also applied to an apparatus such that different processes are executed to the read image from the same original and a plurality of images are simultaneously multiplexed and recorded.

Further, the invention is not limited to the multiple recording from the same original but can be also applied to a multiple recording of the read images from different originals. In such a case, for example, the read signals from different originals are used in place of the image signals of magenta, cyan, yellow, and black described in the first embodiment. In this instance, it is sufficient to exchange the originals by using the automatic document feeder or the like at a timing during the backward movement of the optical system.

In the above embodiment, the distances of the recording images have unevenly set in order to unevenly set the time intervals of the recording images. However, it is also possible to uniformly set the distances of the recording images and to variably set an image moving speed (rotational speed of the photosensitive drum) between the recording images and to unevenly set the time intervals between the recording images.

As described above, when a plurality of color images are recorded at a predetermined paper interval, with respect to the second and subsequent images, the image stored at the time of the formation of the first image is read out from the memory and is recorded, so that the return driving speed of the optical system can be suppressed at a low speed. Therefore, the scanning speed when the image is read can be made approach the scanning speed when returning and it is sufficient to use a narrow variable speed range of the optical system. Consequently, the optical system can be driven at a higher precision and further stably without deteriorating a productivity of the recording images. A picture quality of the copy output can be raised.

On the other hand, since it is sufficient that the return speed of the optical system is slow, a driving sound when the optical system is returned is suppressed. A mechanical vibration when switching the optical system from the returning operation to the going operation is suppressed. An image of a high picture quality can be formed.

When a plurality of images are recorded, by performing a control about the using/non-using state of the memory in accordance with the paper size, it is sufficient to prepare the memory corresponding to a predetermined paper size without providing the memory for the maximum paper size. Therefore, the productivity of the recording images can be raised at low costs.

Particularly, when a plurality of images are recorded by using an image supporting material of a predetermined distance (distance on the circumference), the memory is used and the image recording is executed only when the images are recorded to the paper of the size such that the interval between the front edge of the paper and the rear edge of the previous paper is short, so that the return driving speed of the optical system can be suppressed to a low speed. Therefore, the scanning speed when the image is read can be made approach the scanning speed upon returning. It is sufficient to use a narrow variable speed range of the optical system. Therefore, the optical system can be driven at a higher precision and further stably without deteriorating the productivity of the recording images. The picture quality of the copy output can be raised.

What is claimed is:

1. An image forming apparatus comprising:

scanning means for scanning an image of an original;

reading means for reading the image of the original which is scanned by said scanning means;

memory means for storing the image of the original read by said reading means;

image forming means for forming a visible image onto a recording medium on the basis of an image signal from said reading means and an image signal from said memory means;

a holding member which can hold a plurality of transfer sheets and is used for transferring the visible image formed on said recording medium onto said held transfer sheets; and control means for controlling in a manner such that in case of transferring the same image onto each of said plurality of transfer sheets, said plurality of sheets are held to said holding member at unequal intervals and the visible image is formed onto the first transfer sheet on the basis of the image signal from said reading means and the visible image is formed on the second and subsequent transfer sheets on the basis of the image signal from said memory means.

2. An apparatus according to claim 1, wherein said image forming means has developing means having a plurality of developers containing developing agents of different colors, and said transfer means overlaps and transfers the visible images developed by said developing agents of the different colors onto the transfer sheets.

3. An image forming apparatus comprising:

scanning means for scanning an original;

reading means for reading an image of the original scanned by said scanning means;

memory means for storing the image read by said reading means;

a holding member which can hold a plurality of recording sheets;

image forming means for forming a same color image onto said plurality of recording sheets held to said holding member on the basis of an image signal which is outputted from said reading means and an image signal which is outputted from said memory means; and control means for controlling in a manner such that said plurality of recording sheets are held to said holding member at unequal intervals and the image is formed onto the first recording sheet on the basis of the image signal which is outputted from said reading means and the image is formed on the second and subsequent recording sheets on the basis of the image signal which is outputted from said memory means.

4. An apparatus according to claim 3, wherein said memory means has a capacity to store monochromatic images of one page.

5. An apparatus according to claim 3, wherein in the case where said holding member can hold (N) recording sheets, said control means allows said (N) recording sheets to be held to said holding member so as to reduce an interval between a rear edge of the first recording sheet and a front edge of the second recording sheet and to increase an interval between the rear edge of the N-th recording sheet and a front edge of the first recording sheet.

6. An apparatus according to claim 5, wherein said image forming means forms an image of a first color onto said N-th recording sheet held to said holding member and, after that, forms an image of a second color onto said first recording sheet.

7. An image forming apparatus comprising:

input means for inputting an image signal;

memory means for storing the image signal from said input means;

image forming means for forming a visible image on the basis of the image signal from said input means and the image signal from said memory means; and control means for controlling in a manner such that in case of forming a plurality of same visible images, said visible images are formed at unequal intervals and a first visible image is formed on the basis of the image signal from said input means and a second and subsequent visible images are formed on the basis of the image signal from said memory means.

8. An apparatus according to claim 7, wherein said image forming means has a movable holding member which can hold (N) recording sheets and said image forming means forms the same visible image onto said (N) recording sheets held to said holding member.

9. An apparatus according to claim 8, wherein said control means allows said (N) recording sheets to be held to said holding member at unequal intervals.

10. An apparatus according to claim 9, wherein said control means allows said (N) recording sheets to be held to said holding member so that an interval between a front edge of the first recording sheet and a rear edge of the N-th recording sheet is longer than an interval between a rear edge of the first recording sheet and a front edge of the second recording sheet.

11. An apparatus according to claim 8, wherein said image forming means includes:

latent image forming means for forming a latent image onto a photosensitive material;

developing means for developing said latent image by the toners; and transfer means for transferring the toner image developed by said developing means onto the recording sheets held to said holding member.

12. An apparatus according to claim 11, wherein said developing means has a plurality of developers containing toners of different colors, and said transfer means sequentially overlaps and transfers the toner images of said plurality of colors onto said plurality of recording sheets held to said holding member.

13. A control method for use with an image forming apparatus comprising: scanning means for scanning an image of an original; reading means for reading the image of the original which is scanned by the scanning means; memory means for storing the image of the original read by the reading means; image forming means for forming a visible image onto a recording medium on the basis of an image signal from the reading means and an image signal from the memory means; and a holding member for holding a plurality of transfer sheets and for transferring the visible image formed on the recording medium onto the transfer sheets, said method comprising the steps of:

a) holding the plurality of transfer sheets at unequal intervals on the holding member;

b) forming a visible image on a first transfer sheet held on the holding member on the basis of the image signal from the reading means; and c) forming a visible image identical to the visible image formed on the first transfer sheet onto a second transfer sheet and subsequent transfer sheets held on the holding member on the basis of the image signal from the memory means.

* * * * *